(12) United States Patent
Hashimoto et al.

(10) Patent No.: US 9,239,128 B2
(45) Date of Patent: Jan. 19, 2016

(54) IMAGE FORMING APAPRATUS

(75) Inventors: Yoshinori Hashimoto, Susono (JP);
Taisuke Hyodo, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 13/474,080

(22) Filed: May 17, 2012

(65) Prior Publication Data
US 2012/0305726 A1 Dec. 6, 2012

(30) Foreign Application Priority Data

May 31, 2011 (JP) .................................. 2011-122751
Apr. 19, 2012 (JP) .................................. 2012-096083

(51) Int. Cl.
*A45D 19/04* (2006.01)
*F16M 11/10* (2006.01)
*G03G 15/00* (2006.01)
*G03G 21/16* (2006.01)

(52) U.S. Cl.
CPC ........... *F16M 11/10* (2013.01); *G03G 15/5016* (2013.01); *G03G 21/1661* (2013.01); *F16M 2200/024* (2013.01); *G03G 2221/1684* (2013.01)

(58) Field of Classification Search
CPC ............ F16M 11/10; F16M 2200/024; F16M 11/2021; A47F 9/046

USPC ................... 248/477, 496, 125.3, 397, 291.1, 248/292.12, 922
See application file for complete search history.

(56) References Cited

U.S. PATENT DOCUMENTS 450,250 A * 4/1891 Nacke et al. ............... 248/125.3
1,546,739 A * 7/1925 Le Lande ................. 248/292.12
(Continued)

FOREIGN PATENT DOCUMENTS

| CN | 1655016 A | 8/2005 |
|---|---|---|
| CN | 101246338 A1 | 8/2008 |

(Continued)

*Primary Examiner* — Bradley Duckworth
(74) *Attorney, Agent, or Firm* — Canon U.S.A., Inc. IP Division

(57) ABSTRACT

An image forming apparatus includes a movable member equipped with an operating unit for operating the image forming apparatus, wherein the movable member can be a first state and a second state by changing its position with respect to an main body of the apparatus, and a holding unit configured to hold the movable member, wherein the direction in which the operating unit is depressed in order to operate the image forming apparatus is the direction in which the movable member is depressed when the position of the movable member is changed from the first state to the second state, and wherein the holding unit holds the movable member so that the requisite force for changing the movable member from the first state to the second state is larger than the requisite force for changing the movable member from the second state to the first state.

30 Claims, 20 Drawing Sheets

(56) References Cited

U.S. PATENT DOCUMENTS

| | | | |
|---|---|---|---|
| 5,078,235 A * | 1/1992 | Kohno et al. | 186/61 |
| 7,335,119 B2 * | 2/2008 | White | 473/483 |
| 7,466,820 B2 * | 12/2008 | Lee | 379/428.03 |
| 7,523,907 B2 * | 4/2009 | Chen | 248/292.12 |
| 7,878,666 B2 * | 2/2011 | Muraki et al. | 353/122 |
| 8,113,670 B2 * | 2/2012 | Muraki et al. | 353/122 |
| 8,317,152 B1 * | 11/2012 | Zhou | 248/596 |
| 2005/0040311 A1 * | 2/2005 | Lee | 248/454 |
| 2005/0163558 A1 | 7/2005 | Lee | |
| 2005/0205735 A1 * | 9/2005 | Ichikawa et al. | 248/292.12 |
| 2005/0207112 A1 * | 9/2005 | Bakker et al. | 361/686 |
| 2006/0006298 A1 * | 1/2006 | Akiyama et al. | 248/292.12 |
| 2007/0030410 A1 * | 2/2007 | Cheng | 349/58 |
| 2008/0267389 A1 * | 10/2008 | Nitobe et al. | 379/328 |
| 2009/0103251 A1 * | 4/2009 | Suzuki et al. | 361/679.02 |
| 2009/0309002 A1 * | 12/2009 | Shimotoso | 248/397 |

FOREIGN PATENT DOCUMENTS

| | | |
|---|---|---|
| EP | 1577737 A1 | 9/2005 |
| JP | 59-167269 U | 11/1984 |
| JP | 2003-274070 A | 9/2003 |
| JP | 2004-45585 A | 2/2004 |
| JP | 2006-3825 A | 1/2006 |
| JP | 2007-163812 A | 6/2007 |
| JP | 2009-105557 A | 5/2009 |
| TW | 288936 U | 3/2006 |

* cited by examiner

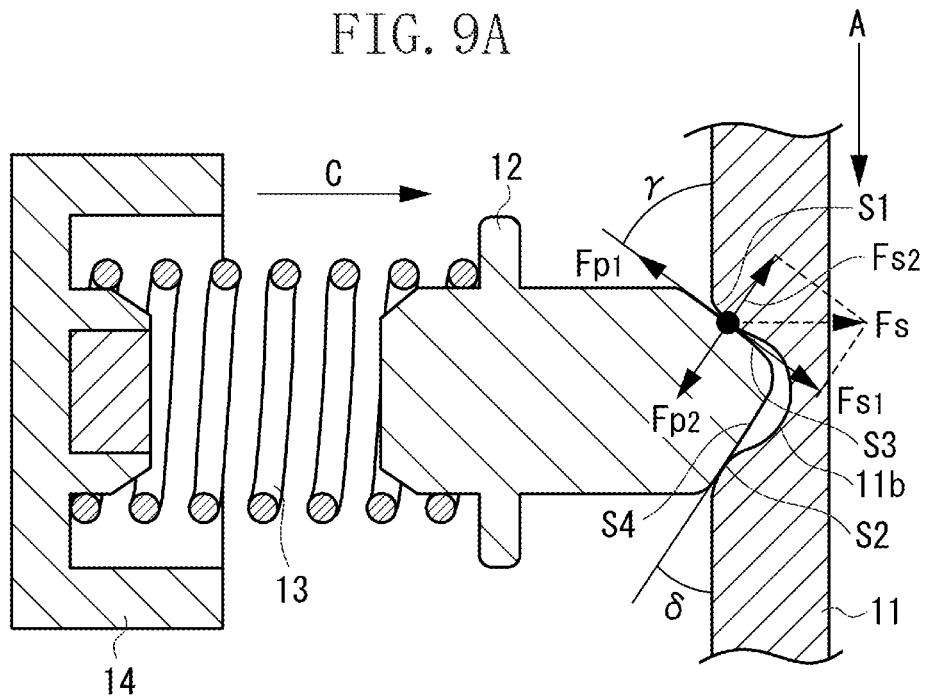
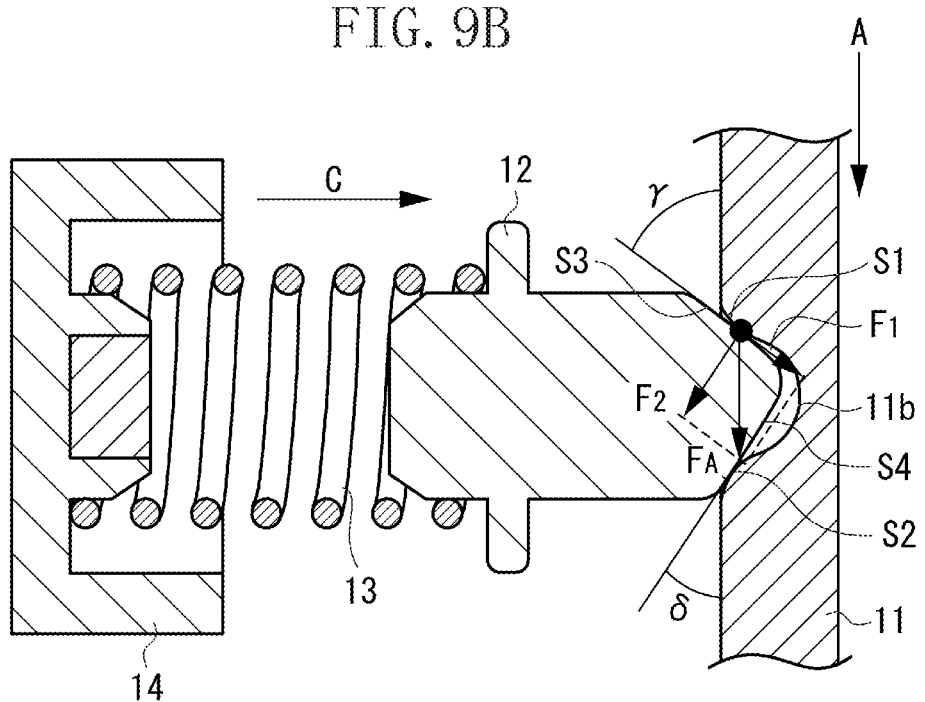

IMAGE FORMING APAPRATUS

BACKGROUND OF THE INVENTION

1. Field of the Invention

The present invention relates to an image forming apparatus equipped with a movable member capable of changing its position with respect to a main body of the apparatus.

2. Description of the Related Art

An image forming apparatus is provided with an operating unit equipped with a button, touch panel, and the like allowing the user to operate the apparatus, and an indicating unit displaying the condition of the apparatus, etc. In recent years, there is a demand for securing the operability and visibility of such an operating unit and a indicating unit, and adjustability of the operability and visibility according to the user's usage while keeping the size of the entire main body of the apparatus during transportation and storage.

Thus, Japanese Patent Application Laid-Open No. 2007-163812 discusses a configuration in which an operating unit and a indicating unit are provided on the movable member held so as to allow a change in its position with respect to the main body of the apparatus through a change in angle and height.

Further, in order to allow the cartridge for image formation to be replaced and jamming generated within the apparatus to be dealt with, the image forming apparatus is provided with an opening and closing member that can be opened and closed with respect to the main body of the apparatus, revealing the interior of the apparatus when opened with respect to the main body of the apparatus.

Japanese Utility Model Application Laid-Open No. 59-167269 discusses a configuration in which the user can open such an opening and closing member to a predetermined position, with the opening and closing member being held at that position so as to be capable of changing its position with respect to the main body of the apparatus.

A holding configuration for the conventional movable member as mentioned above will be described. FIGS. 10A through 10C are schematic sectional diagrams illustrating a holding configuration. A rotatable arm 51 is connected integrally with the movable member rotatably supported by the main body of the apparatus. The arm 51 is provided with a plurality of engaging grooves 51b.

On the main body of the apparatus side, there are provided an engagement pin 52 that can be fit-engaged with the engaging grooves 51b, a compression spring 53 urging the engagement pin 52, and a spring holder 54 serving as a seat for the compression spring 53. An arrow C indicates the direction in which the compression spring 53 expands and contracts. The arm 51 is rotated to fit-engage the engagement pin 52 with one of the plurality of engaging grooves 51b, and urging in the fit-engagement direction is effected by compression spring 53, whereby the arm 51 and the movable member are maintained in a predetermined position.

In a case where the operating unit is provided on the movable member, when the user depresses the operating unit backwards from the front surface of the operating unit in order to operate the operating unit, it is necessary for the movable member to be firmly held so that the movable member may not be allowed to move backward due to the depressing force. In this regard, it might be possible to enhance the spring force of the compression spring 53 and to enhance the resistance force to the movement of the movable member, thereby strengthening the holding force with which the movable member is held.

However, also when moving the movable member from the rear side to the front side, it is necessary to move the movable member against this resistance force (holding force), so that an unnecessarily large operation force is required, which can impair the usability of the apparatus. Further, the way the weight of the movable member itself affects differs between the case where the movable member is started to be moved against the gravitational force and the case where it is started to be moved along the gravitational force, so that if the resistance force (holding force) is adjusted to the movement in one direction of the movable member, the usability of the apparatus may be impaired.

In this way, in a holding configuration in which the resistance force (holding force) with respect to the movement of the movable member is fixed independent of the moving direction of the holding member, the usability of the apparatus may be impaired.

However, the conventional movable member holding configuration leaves room for an improvement in terms of operability. Therefore, the present invention aims to provide an image forming apparatus having a movable member holding configuration improved in terms of usability.

SUMMARY OF THE INVENTION

According to an aspect of the present invention, an image forming apparatus includes: a movable member equipped with an operating unit for operating the image forming apparatus, wherein the movable member can assume a first state and a second state by changing its position with respect to an main body of the apparatus; and a holding portion configured to hold the movable member, wherein the direction in which the operating unit is depressed in order to operate the image forming apparatus is the direction in which the movable member is depressed when the position of the movable member is changed from the first state to the second state, and wherein the holding portion holds the movable member such that the requisite force for changing the movable member from the first state to the second state is larger than the requisite force for changing the movable member from the second state to the first state.

According to another aspect of the present invention, an image forming apparatus includes: an opening and closing member movable with respect to an main body of the apparatus and capable of revealing the interior of the main body of the apparatus, wherein the opening and closing member is movable between a first position and a second position; and a holding portion configured to hold the opening and closing member, wherein when the opening and closing member is moved from a third position between the first position and the second position toward the second position, the opening and closing member moves at least vertically downwards, and when the opening and closing member moves from the third position toward the first position, the opening and closing member moves at least vertically upwards, and wherein the holding portion holds the movable member such that the requisite force for starting movement of the opening and closing member from the third position toward the second position is larger than the requisite force for starting movement of the opening and closing member from the third position toward the first position.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9A is a sectional view illustrating the force applied to the engagement pin while it maintains the position of the movable member, and FIG. 9B is a sectional view illustrating the force applied to the engagement pin when the movable member is rotated in the tilting direction (the direction A).

DESCRIPTION OF THE EMBODIMENTS

Various exemplary embodiments, features, and aspects of the invention will be described in detail below with reference to the drawings.

Figure 1A:
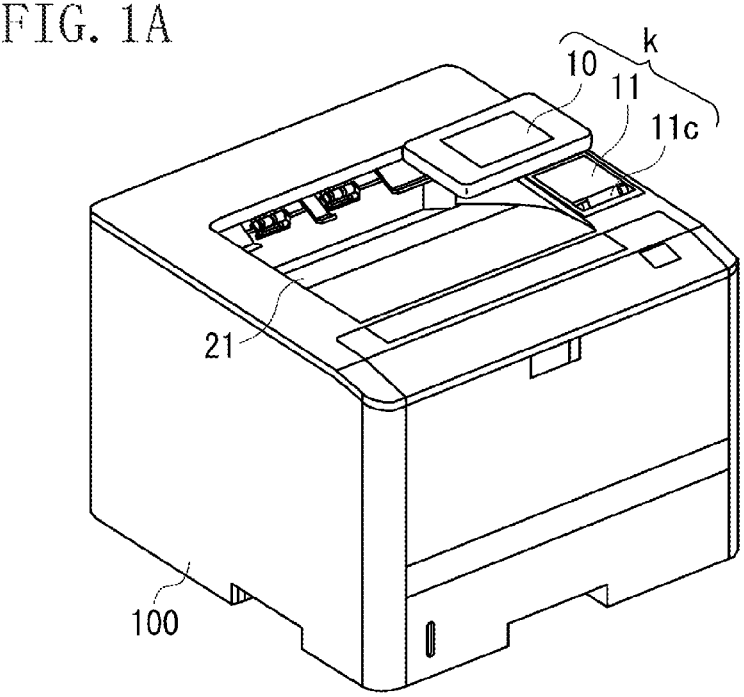
FIG. 1A is a perspective view of an image forming apparatus with a movable member being flat.
Figure 1B:
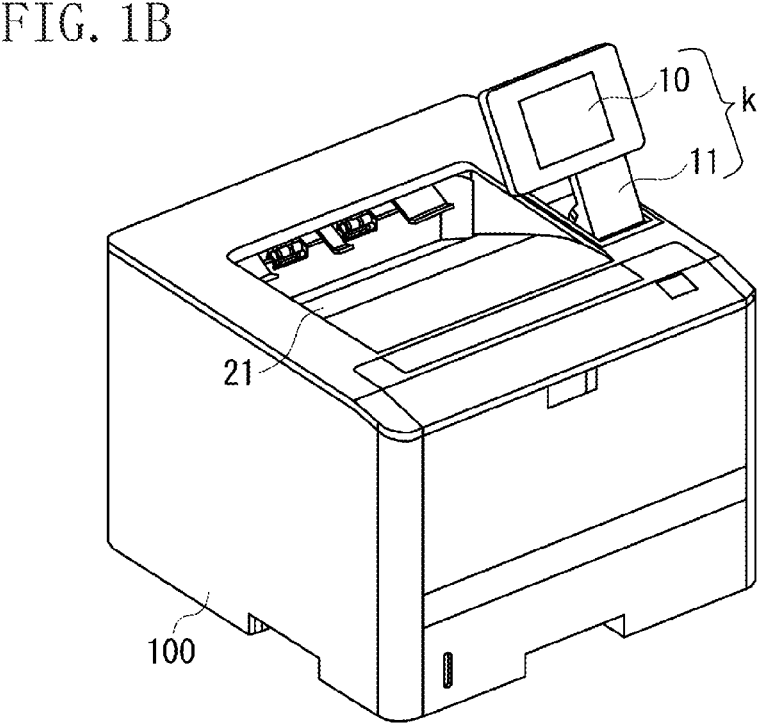
FIG. 1B is a perspective view of the image forming apparatus with the movable member being erect.

First, an image forming apparatus according to an exemplary embodiment will be illustrated with reference to FIGS. 1A and 1B. FIGS. 1A and 1B are perspective views of the image forming apparatus. FIG. 1A illustrates a state in which a movable member K is flat, and FIG. 1B illustrates a state in which the movable member K is erect. The movable member K will be described below.

An image forming apparatus 100 according to the present exemplary embodiment is an electrophotographic image forming apparatus. Provided inside the main body of the image forming apparatus 100 are a photosensitive drum (not illustrated), a charger serving as a processing unit acting on the photosensitive drum, a scanner unit, a developing device, a transfer roller, a cleaner, and a fixing device.

When an image is to be formed on a sheet serving as a recording material, the surface of the photosensitive drum is charged by the charger while rotating the photosensitive drum, and exposure is performed on the charged surface of the photosensitive drum to form a latent image. The latent image is visualized as a toner image by the developing device, and the toner image is formed on the surface of the photosensitive drum.

Next, the toner image on the surface of the photosensitive drum is transferred onto the sheet, which has been conveyed to a transfer nip portion between the transfer roller and the photosensitive drum. Then, the sheet is conveyed to the fixing device, and heated and pressurized at a fixing nip. Thus, a fixed image is formed on the sheet.

The toner remaining on the surface of the photosensitive drum without having been transferred to the sheet at the transfer nip portion is removed from the surface of the photosensitive drum by the cleaner. The sheet on which the fixed image has been formed is discharged from above onto a stacking surface 21 and is stacked thereon. Forming an image on the surface of a sheet and discharging the sheet onto the stacking surface 21 in this way will be defined as the image forming operation.

Provided on the upper surface of the image forming apparatus 100 is a touch panel 10 supported by an arm 11. The touch panel 10 functions as an indicating unit, and as an operating unit enabling the user to operate or control the apparatus by touching this touch panel.

When the user touches (depresses) the touch panel 10, a signal is output therefrom. This signal is transmitted to a control unit (not illustrated) provided inside the image forming apparatus in order to control the image forming operation. Based on this signal, the operation of the image forming apparatus 100, such as the image forming operation, is controlled.

In the image forming apparatus according to the present exemplary embodiment, the movable member K, which is equipped with the touch panel 10 and the arm 11, is held on the image forming apparatus 100 so as to allow a change in its angle, height (position), and the like so that the operability and visibility of the touch panel 10 may be freely changed in conformity with the usage by the user. Next, the holding mechanism for this movable member K will be illustrated.

Figure 2A:
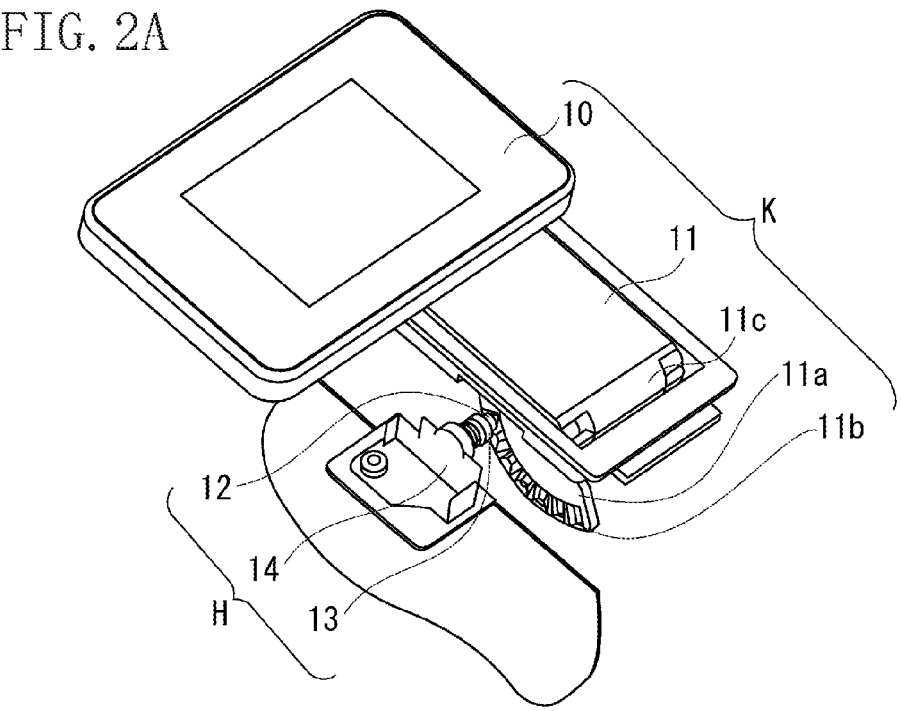
FIG. 2A is a perspective view of a portion around an operating unit with the movable member being flat.
Figure 2B:
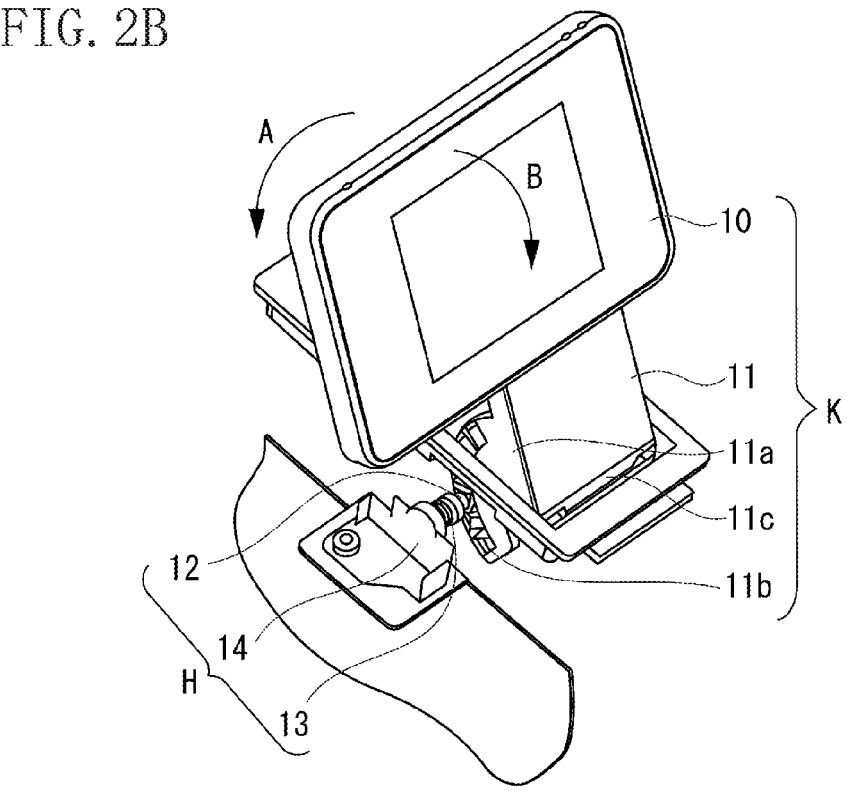
FIG. 2B is a perspective view of the portion around the operating unit with the movable member being erect.

FIG. 2A is a perspective view of the portion around the movable member K with the movable member K being flat (in a second state), and FIG. 2B is a perspective view of the portion around the movable member K with the movable member K being erect (in a first state). For the sake of simplicity, in FIGS. 2A and 2B, the exterior portion of the apparatus is partly illustrated in section to reveal the interior of the apparatus.

The movable member K is supported by the main body of the apparatus 100 so as to be rotatable around a rotation center (rotation shaft) 11c. A sector-shaped disc portion 11a is integrally formed on the arm 11. A plurality of engaging groove portions (recesses) 11b are arranged side by side in the circumferential direction of the disc portion 11a (the circumferential direction around the rotation shaft 11c of the arm 11). The movable member K is formed by the touch panel 10, the arm 11, and the portion integrally formed with the arm 11.

Provided on the image forming main body of the apparatus 100 side are an engagement pin (protrusion) 12 capable of being engaged with the groove portions 11b of the arm 11, a compression spring 13 urging the engagement pin 12 toward the rotation shaft 11c, and a spring holder 14 holding the engagement pin 12 and the compression spring 13. Due to the restoring force of the compression spring 13, the engagement pin 12 is urged toward the rotation shaft 11c so as to be engaged with the groove portions 11b.

In the state in which the engagement pin 12 is engaged with one of the groove portions 11b, the arm 11 is maintained in that position, and the movable member K is also maintained in a predetermined position via the arm 11. In this way, the engagement pin 12, the compression spring 13, and the spring holder 14 function as a holding portion H for the arm 11 and the movable member K.

Next, the holding mechanism for the movable member K, formed by the engagement pin 12 and the engaging groove portions 11b, will be described. A change in the position of the movable member K is performed by imparting a predetermined load to the movable member K or the arm 11 to change that groove portion 11b of the plurality of groove portions 11b which is to be entered by the engagement pin 12. This will be described in detail below.

Figure 3:
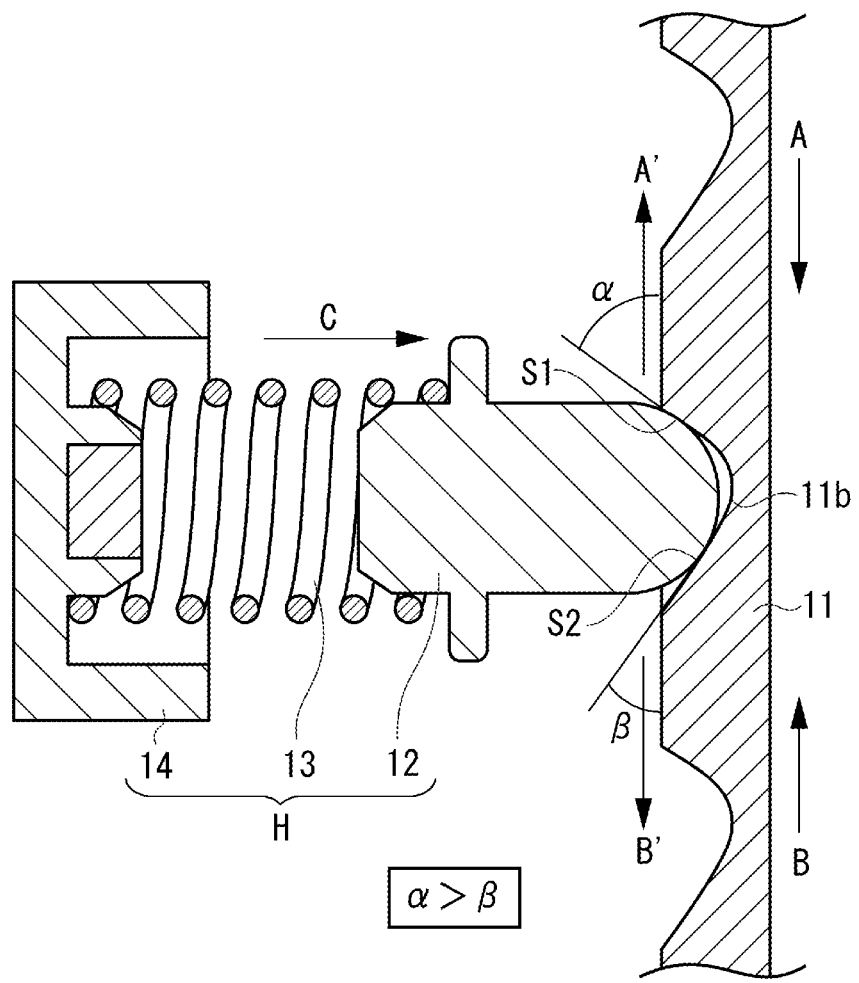
FIG. 3 is a sectional view of a portion around the movable member with the movable member held.

FIG. 3 is a sectional view, as seen from the direction orthogonal to the rotation shaft 11c, of the holding mechanism for the movable member K, with the movable member K maintained in a predetermined position.

Figure 4A:
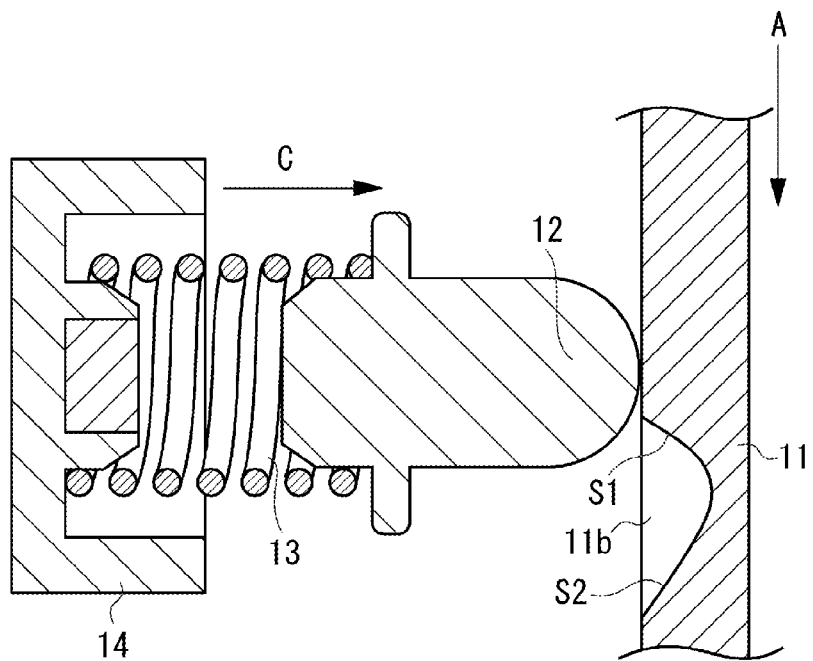
FIG. 4A is a sectional view of the portion around the movable member when the movable member is rotated in a tilting direction.
Figure 4B:
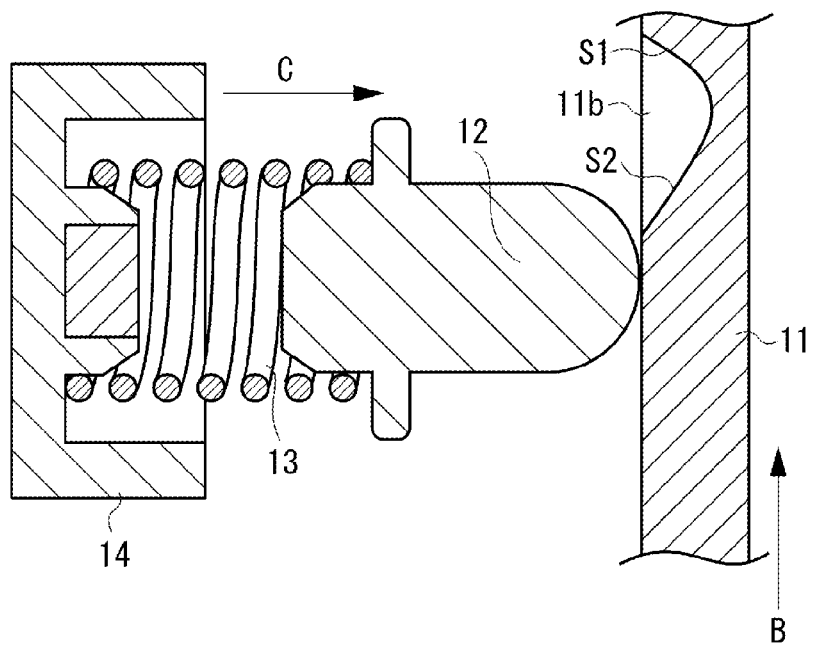
FIG. 4B is a sectional view of the portion around the movable member when the movable member is rotated in an erecting direction.

FIG. 4A is a sectional view, as seen from the direction orthogonal to the rotation shaft 11c, of the holding mechanism for the movable member K when the movable member K is being rotated from the predetermined position in the tilting direction (in the direction A: the first direction), and FIG. 4B is a sectional view, as seen from the direction orthogonal to the rotation shaft 11c, of the holding mechanism for the movable member K when the movable member K is being rotated from the predetermined position in the erecting direction (the direction B: the second direction).

As illustrated in FIG. 3, the engagement pin 12 is urged in a direction C by the compression spring 13, and is fit-engaged with the engaging groove portion 11b while in contact with a regulating surface S1 and a regulating surface S2. Due to the action of the compression spring 13, the engagement pin 12 is brought into contact with the regulating surfaces S1 and S2 and is regulated in its movement, whereby the engagement pin 12 is maintained in the state in which it is fit-engaged with the engaging groove portion 11b.

The engagement pin 12 is regulated in its movement in a direction orthogonal to the direction C by a guide (not illustrated) provided in the main body of the apparatus 100, so that it can only move indirection C and a direction opposite thereto.

However, there is provided some play between the engagement pin 12 and the guide (not illustrated) in a direction orthogonal to the direction C, so that the engagement pin 12 can smoothly move in the direction C without being caught.

With the above configuration, when the arm 11 moves in the direction A, the engagement pin 12 moves in the direction opposite to the direction C against the urging force of the compression spring 13 beyond the regulating surface S1, with the result that the state is attained in which the fit-engagement (engagement) with the engaging groove 11b is released as illustrated in FIG. 4A.

Similarly, when the arm 11 moves in the direction B, the engagement pin 12 moves in the direction opposite to the direction C against the urging force of the compression spring 13 beyond the regulating surface S2, with the result that the state is attained in which the fit-engagement (engagement) with the engaging groove 11b is released as illustrated in FIG. 4B.

When the arm 11 moves in the direction A, the regulating surface S1 is inclined by $\alpha(°)$ ($\alpha \leq 90°$) with respect to a direction A' in which the engagement pin 12 strives to move relative to the engaging groove portion 11b. When the arm 11 moves in the direction B, the regulating surface S2 is inclined by $\beta$ (°) ($\beta \leq 90°$) with respect to a direction B' in which the engagement pin 12 strives to move relative to the engaging groove portion 11b.

Figure 5A:
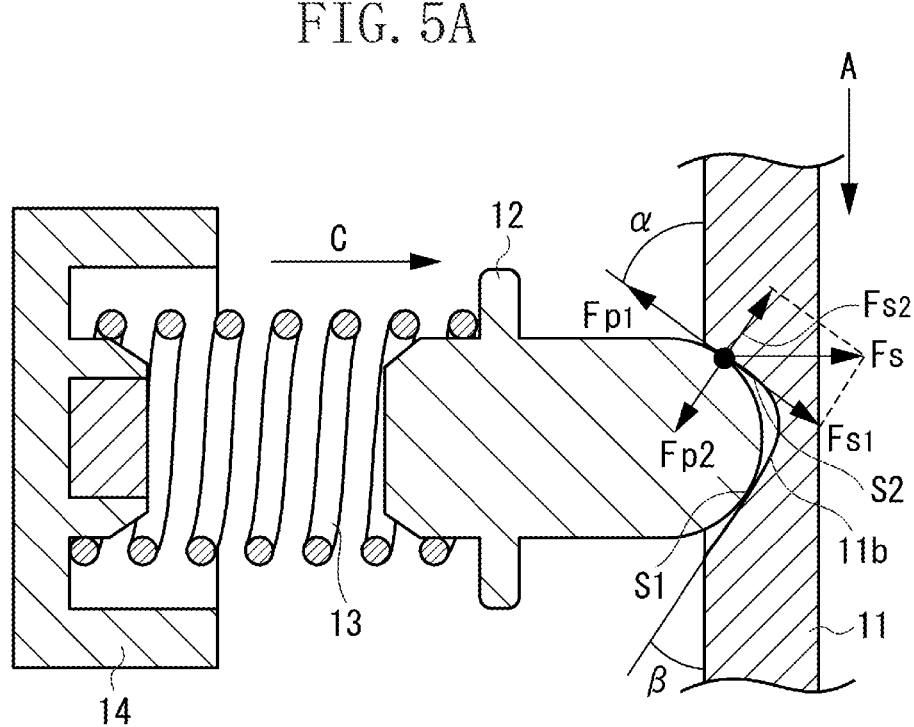
FIG. 5A is a sectional view illustrating a force applied to an engagement pin with the position of the movable member maintained.

FIG. 5A is a diagram illustrating a force applied to the engagement pin 12 fit-engaged with the engaging groove portion 11b.

As illustrated in this diagram, assuming that the force applied from the engagement pin 12 to the engaging groove portion 11b of the arm due to the urging force of the compression spring 13 is Fs, the components in the tangential direction and in the vertical direction of the force Fs can be expressed as $Fs1=Fs \sin \alpha$ and $Fs2=Fs \cos \alpha$. The reaction forces applied to the engagement pin 12 from the engaging groove portion 11b of the arm can be expressed as $Fp1=Fs \sin \alpha$ and $Fp2=Fs \cos \alpha$.

Figure 5B:
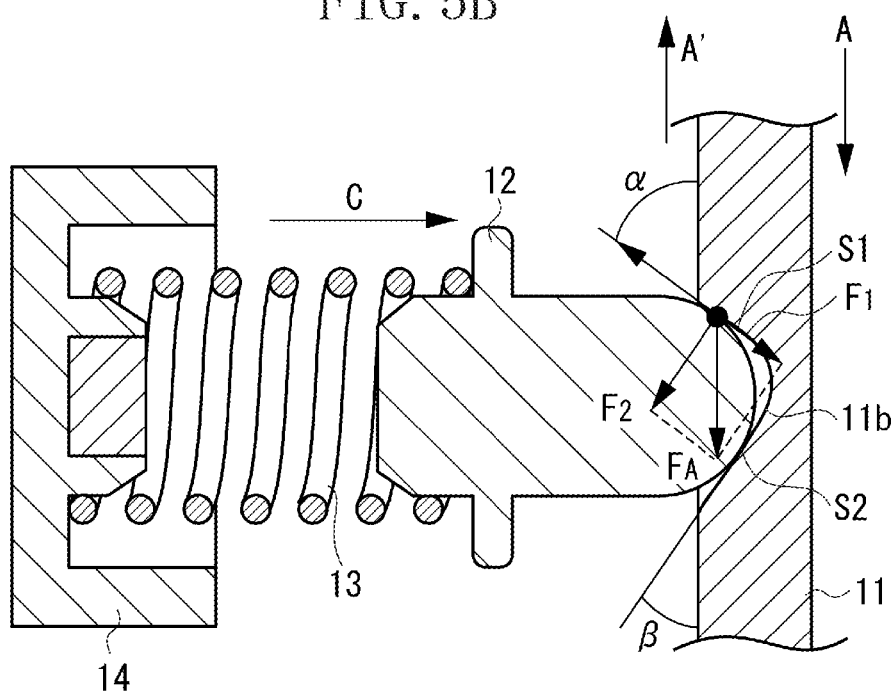
FIG. 5B is a sectional view illustrating a force applied to the engagement pin when the movable member is rotated in the tilting direction (the direction A).

FIG. 5B is a diagram illustrating the force applied to the engagement pin 12 when it rotates so as to tilt the movable member K (in the direction A).

Assuming that a force FA is applied to the engagement pin 12 when it rotates so as to tilt the movable member K (in the direction A), the components of the force FA in the tangential direction and in the vertical direction can be respectively expressed as $FA=FA \cos \alpha$ and $F2=FA \sin \alpha$.

The engagement pin 12 is in contact with the engaging groove portion 11b at two positions, i.e., in contact with the regulating surface S1 in the direction in which the movable member K is tilted (in the direction A) and in contact with the regulating surface S2 in the direction in which the movable member is erected (in the direction B), and the engagement pin 12 is kept in position when the reaction forces transmitted from the regulating surfaces S1 and S2 are in equilibrium with each other. That is, in this state, the position of the movable member K is maintained.

Thus, when the arm is rotated so as to tilt the movable member K (in the direction A), there is imparted a force $F1=FA \cos \alpha$, which is larger than the component in the tangential direction of the force applied from the arm groove portion 11b to the engagement pin 12, i.e., $Fs=Fs \sin \alpha$. As a result, the engagement pin 12 climbs onto the regulating surface S1 of the groove portion 11b as illustrated in FIG. 4A. Therefore, it is possible to change the groove portion 11b to be entered by the engagement pin 12.

That is, to change the groove portion 11b to be entered by the engagement pin 12 and to change the position of the movable member K, the following condition is required:

$$F1 = FA \cos\alpha > Fp1 = Fs \sin\alpha$$

From the above equation, the requisite force for changing the position of the movable member K can be expressed as follows:

$$FA > Fs \tan\alpha \ (\alpha \le 90°) \quad (1)$$

That is, if the urging force Fs of the compression spring Fs is constant, the larger the angle α of the regulating surface S1 of the engaging groove portion 11b, the larger the requisite force for changing the position of the movable member K since it is impossible to change the position of the movable member K unless a large load is applied to the movable member K.

In other words, the larger the angle α of the regulating surface S1, the larger the resistance the holding portion H imparts to the movable member K when the movable member K is moved in the direction A to change its position.

Similarly, assuming that the force applied to the engagement pin 12 when the movable member K is rotated in the erecting direction (in the direction B) is FB, it is necessary to apply the following force in the direction opposite to that mentioned above before the rotating direction of the movable member K can be changed to the erecting direction (the direction B):

$$FB > Fs \tan\beta \ (\beta \le 90°) \quad (2)$$

At this time, the user imparts the force FB, which is larger than Fs tan β, whereby, as illustrated in FIG. 4B, the engagement pin 12 climbs up from the regulating surface S2 of the engaging groove portion 11b of the arm 11. Therefore, it is possible to change the groove portion 11b to be entered by the engagement pin 12.

As in the case where the movable member is moved in the direction A, if the urging force Fs of the compression spring 13 is constant, the smaller the angle β of the regulating surface S2 of the engaging groove portion 11b, the smaller the requisite load to be applied to the movable member K in order to change the position of the movable member K.

In other words, the smaller the angle β of the regulating surface S2, the smaller the resisting force the holding portion H imparts to the movable member K when moving the movable member in the direction B to change its position, and the smaller the requisite force for changing the position of the movable member K.

In the present exemplary embodiment, the movable member K provided with a large-screen touch panel 10 is mounted on the upper portion of the main body of the apparatus 100. Since the touch panel 10 is of large screen, the movable member K has a considerable weight, so that a large holding force is required in firmly holding movable member K.

Further, when the user touches the touch panel 10 in order to control the image forming apparatus 100, a pressurizing force acts to the movable member K from the front side to the rear side (i.e., in the direction in which the movable member K is tilted). Thus, when the user touches the touch panel 10 in order to control the image forming apparatus 100, it is necessary to hold the movable member K with a holding force large enough to prevent displacement of the position of the movable member K.

In view of this, it might be possible to augment the urging force of the compression spring in order to augment the holding force for the movable member K. If the urging force of the compression spring 13 is augmented, the force Fs imparted to the arm engaging groove portion 11b by the engagement pin 12 is increase, resulting in an increase in the requisite force for the movement to the next engaging groove portion 11b when rotating the movable member K and the arm 11.

Thus, also when moving the movable member K so as to erect it, it is necessary to move the movable member against this holding force, which means an unnecessarily large operation force is required. As a result, the usability of the apparatus may be impaired.

Figure 10A:
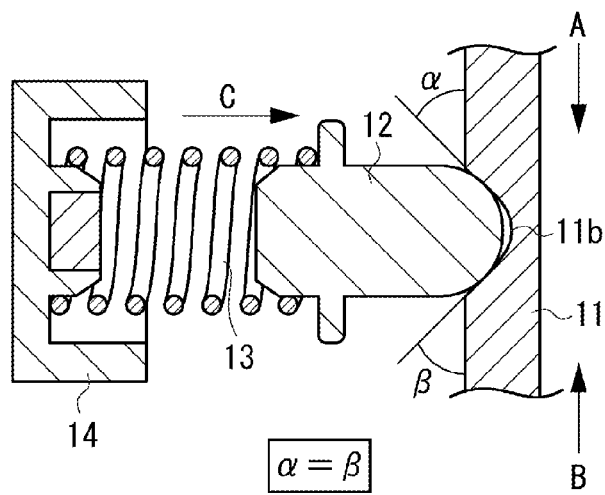
FIG. 10A is a sectional view of the portion around the movable member with the movable member held in a conventional configuration.
Figure 10B:
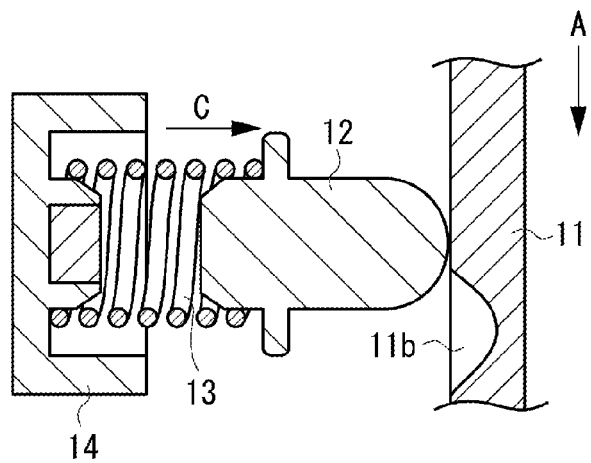
FIG. 10B is a sectional view of the portion around the movable member when the movable member is rotated in the tilting direction in the conventional configuration.
Figure 10C:
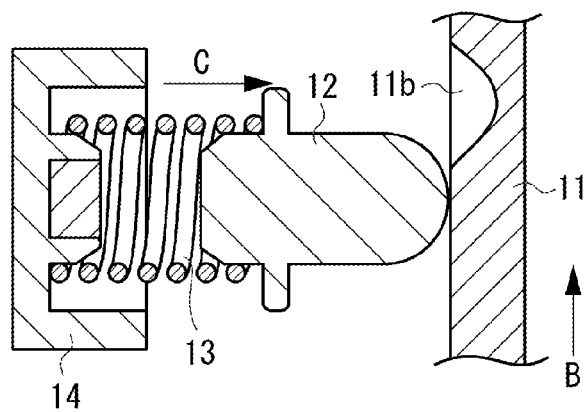
FIG. 10C is a sectional view of the portion around the movable member when the movable member is rotated in the erecting direction in the conventional configuration.

However, with the configuration of the conventional movable member illustrated in FIG. 10A, independently of the operating direction (rotating direction), the angles of the regulating surfaces S1 and S2 of the engaging groove portion 52 are the same (α=β), and the requisite operation force for the user to change the installation angle of the movable member K is also the same independently of the operating direction (rotating direction), that is, Fs tan α=Fs tan β. From the above equations (1) and (2), FA=FB, so that the same operation force is required also when erecting the movable member.

Thus, if the urging force of the compression spring 13 is augmented in order to hold the movable member K of large screen and of large weight so as to prevent its movement, the requisite operating force at the time of erection becomes unnecessarily large. As a result, the usability of the apparatus may be impaired.

In view of this, in the present invention, the operation force for adjusting the position of the movable member K differs according to the rotating direction of the movable member.

That is, in the present exemplary embodiment, the angles α and β of the regulating surfaces S1 and S2 with respect to the direction in which the engagement pin 12 strives to move with respect to the engaging groove portion 11b when moving the movable member K, are set to different angles.

More specifically, setting is made such that α>β. Due to this setting, the requisite operation force FA when rotating the movable member K and the arm 11 in the tilting direction is larger than the requisite operation force FB when rotating them in the erecting direction.

In other words, the resisting force the holding portion H imparts to the movable member K when changing the position of the movable member K through its movement in the direction A from the predetermined position, is larger than the resisting force the holding portion H imparts to the movable member K when changing the position of the movable member K through its movement in the direction B.

When this relationship is considered using the above-mentioned formulas, the following relationship holds true:

$$Fs \tan\alpha > Fs \tan\beta$$

That is, from the formulas (1) and (2), FA>FB, which means it is possible to change the operation force according to the rotating direction of the movable member K.

In the present exemplary embodiment, there are provided seven engaging groove portions 11b. In each of these seven engaging groove portions 11b, the angle α of the regulating surface S1 is set to 50 to 60°, and the angle β of the regulating surface S2 is set to 35 to 40°. The angle α of the regulating surface S1 the engagement pin 12 gets over when tilting the movable member K is set to be larger than the angle β of the regulating surface S2 the engagement pin 12 gets over when erecting the movable member K.

As a result, a sufficient holding force is provided when rotating the movable member K in the tilting direction (the direction A), and the operation force when rotating the same in the erecting direction (the direction B) does not become unnecessarily large.

Figure 6:
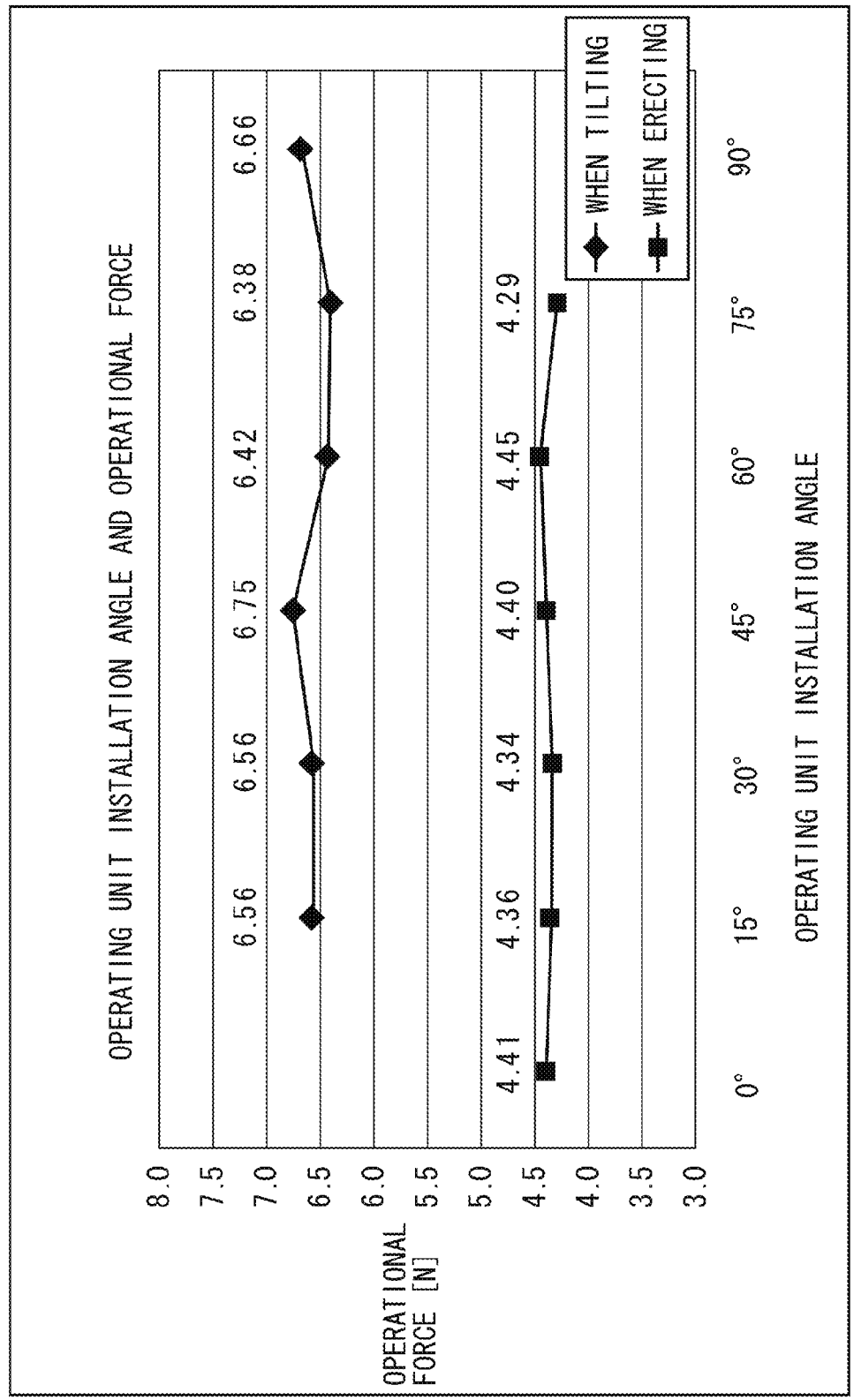
FIG. 6 is a graph illustrating movable member measurement data involved when moving the movable member.

FIG. 6 is a graph illustrating the results of the measurement of the operation force when the installation angle of the movable member K is changed, with the spring pressure of the compression spring 13 being 16N.

The horizontal axis of the graph indicates the installation angle of the movable member K, that is, the angle by which the touch panel 10 of the movable member K is inclined with respect to the upper surface of the main body of the apparatus 100. When the installation angle is 0°, the movable member K lies flat with respect to the main body of the apparatus 100 (i.e., the surface of the touch panel 10 is horizontal). The vertical axis indicates the operation force when the position of the movable member K is changed.

In the present exemplary embodiment, the installation angle of the movable member K can be set to the seven angles of 0°, 15°, 30°, 45°, 60°, 75°, and 90°, and the graph shows the operation force at each installation angle and in each operating direction. It can be seen from the graph that the operation force involved when the movable member K is rotated in the tilting direction (the direction A) is of a value larger than approximately 2N than that when it is rotated in the erecting direction (the direction B).

As a result, when the touch panel 10 is to be operated, it is possible to firmly hold the movable member K so that it may not be allowed to be tilted, and when the movable member K is to be erected, it is possible to smoothly change its angle.

Further, in the present exemplary embodiment, the operation force when rotating the movable member in the same direction is fixed independently of the installation angle. This is made possible by setting the angles α and β of the regulating surfaces S1 and S2 of the engaging groove portion 11b at each installation angle to different values so that the operation force may not undergo fluctuations with a change in installation angle due to the weight of the movable member K itself.

That is, the further the movable member K moves in the tilting direction (the direction A) within the movable range (the installation angle range of 0 to 90°) for the movable member K, the greater the influence of the weight of the movable member K itself exerted on the movable member. Thus, setting is made such that the nearer the installation angle approaches the horizontal direction, the larger the angle α of the regulating surface S1 onto which the engagement pin climbs when the movable member K is rotated in the tilting direction (the direction A).

On the other hand, the further the movable member K is moved in the erecting direction (the direction B) within the movable range for the movable member K, the less subject becomes the position of the movable member K to the influence of its own weight. Thus, setting is made such that the nearer the installation angle to the vertical direction, the larger the angle β of the regulating surface S2 onto which the engagement pin climbs when the movable member is rotated in the erecting direction.

In the present exemplary embodiment, the relationship between the installation angle of the movable member K and the angles α and β of the regulating surfaces S1 and S2 of the engaging groove portion 11b, is set as follows:
0°: β=35°
15°: α=60°, β=35°
30°: α=60°, β=35°
45°: α=60°, β=37.5°
60°: α=57.5°, β=40°
75°: α=55°, β=40°
90°: α=50°, β=90°

In this way, the angles α and β of the regulating surfaces S1 and S2 are set taking into account the weight of the movable member K itself, whereby it is possible to maintain the requisite operation force for effecting a change in position in the same rotating direction at a fixed level as illustrated in FIG. 6.

The reason for setting the angle β to 90° when the installation angle of the movable member K is 90° is to prevent the movable member K from rotating further than 90° in view of the visibility of the operation panel.

That is, retention is effected not by an inclined surface but by a vertical surface with respect to the direction in which the engagement pin 12 moves, and further, the intrusion amount of the engagement pin 12 is increased with respect to the engaging groove portion 11b. Thus, the engagement pin 12 is prevented from climbing onto the surface from the engaging groove portion 11b, that is, further rotation thereof is prevented.

As described above, in the present exemplary embodiment, the angles α and β of the regulating surfaces S1 and S2 regulating the movement of the engaging groove portion 11b of the engagement pin 12 are made different from each other, whereby the resisting force the holding portion H imparts to the movable member K when changing the position of the movable member by moving the movable member K in the tilting direction (the direction A) from the predetermined position, is larger than the resisting force the holding portion H imparts to the movable member K when changing the position of the movable member by moving the movable member K in the erecting direction (the direction B) from the predetermined position.

That is, in the present exemplary embodiment, by making the angles of the regulating surfaces S1 and S2 different from each other, the holding force with which the movable member K is held differs according to the direction in which the movable member K is moved, so that it is possible to attain compatibility between stable retention of the movable member K and smooth change in the installation angle (position), making it possible to achieve an improvement in terms of the usability of the movable member K, i.e., to make the apparatus satisfactory in terms of usability.

Next, a second exemplary embodiment of the present invention will be described. The description of the portions similar to those of the image forming apparatus according to the first exemplary embodiment is omitted, and only the different portions will be described.

Figure 7:
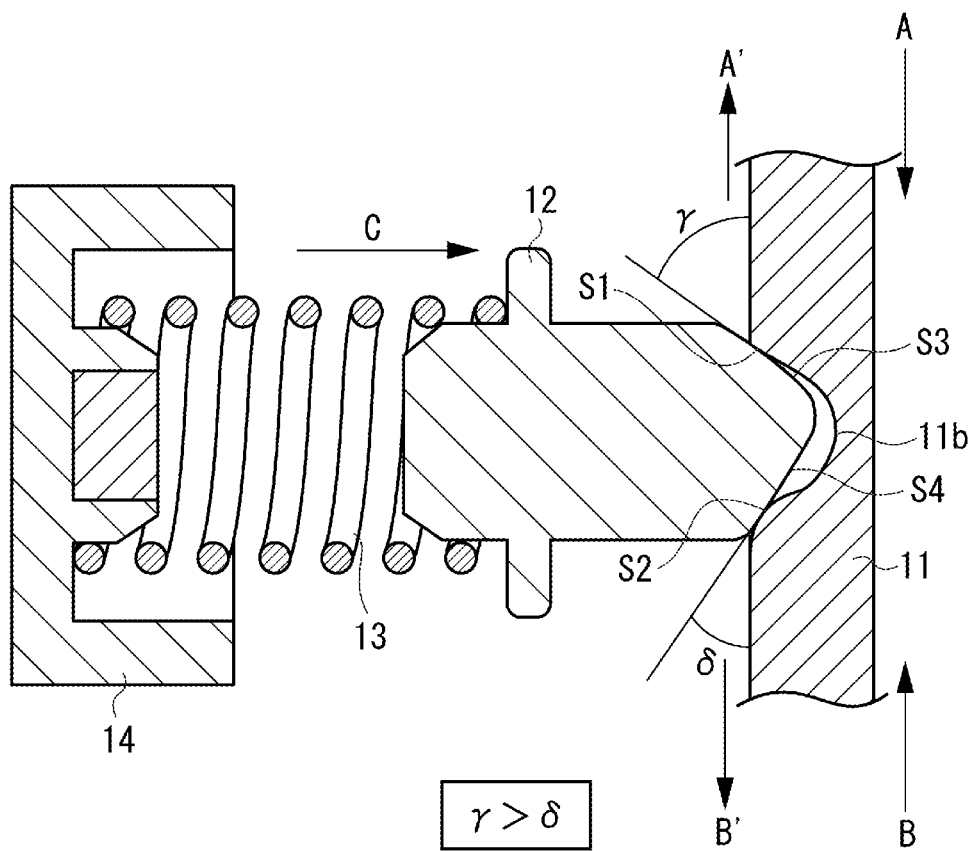
FIG. 7 is a sectional view of the portion around the movable member with the movable member held.
Figure 8A:
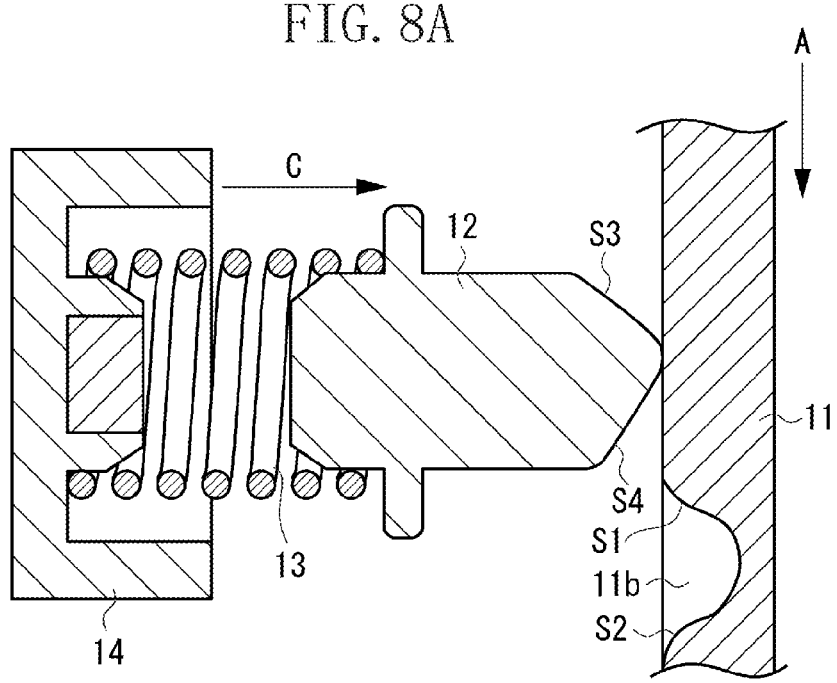
FIG. 8A is a sectional view of the portion around the movable member when the movable member is rotated in the tilting direction.
Figure 8B:
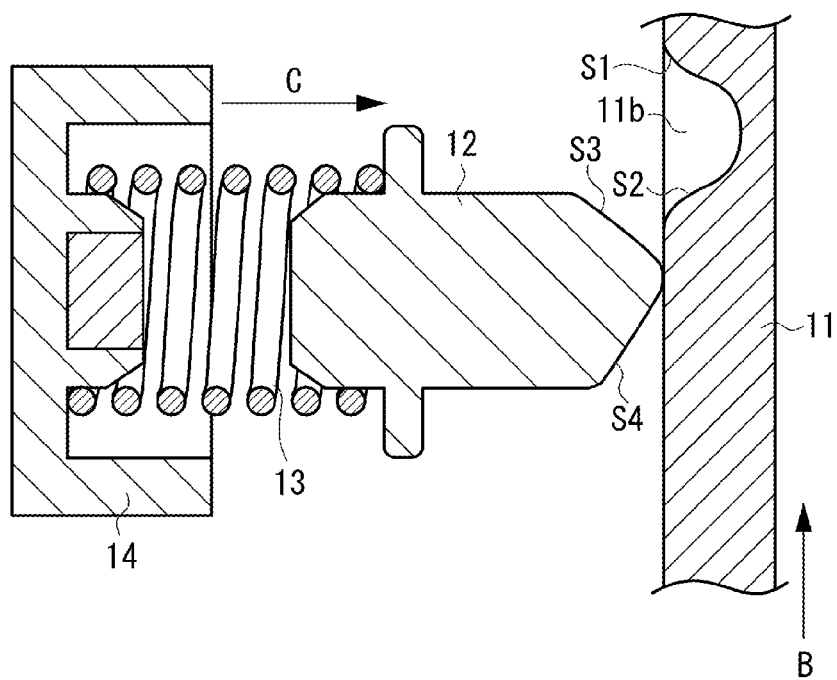
FIG. 8B is a sectional view of the portion around the movable member when the movable member is rotated in the erecting direction.

The holding mechanism for the movable member K according to the second exemplary embodiment will be described. FIG. 7 is a sectional view of the portion around the movable member K, with the movable member K being held. FIG. 8A is a sectional view of the portion around the movable member K when the movable member is being rotated in the tilting direction (the direction A), and FIG. 8B is a sectional view of the portion around the movable member K when the movable member K is being rotated in the erecting direction (the direction B).

FIG. 9A is a sectional view illustrating the force applied to the engagement pin 12 while it maintains the position of the movable member K, and FIG. 9B is a sectional view illustrating the force applied to the engagement pin 12 when the movable member is being rotated in the tilting direction (the direction A).

In the present exemplary embodiment, the engaging groove portion 11b is of a semi-circular configuration symmetrical with respect to the direction in which the engagement pin 12 enters, and there are formed the regulating surfaces S1 and S2 regulating the movement of the engagement pin 12 fit-engaged with the engaging groove portion.

Further, the engagement pin 12 is provided with two contact surfaces S3 and S4 to be held in contact with the regulating surfaces S1 and S2 of the engaging groove portion 11b. In the state in which the engagement pin 12 is fit-engaged with the engaging groove portion 11b, the contact surface S3 is in contact with the regulating surface S1, and the contact surface S4 is in contact with the regulating surface S2.

When the movable member K moves in the tilting direction (the direction A), the contact surface S3 is inclined by $\gamma(°)$ ($\gamma \leq 90°$) with respect to the direction A' in which the engagement pin 12 moves relative to the engaging groove portion 11b. When the movable member K moves in the erecting direction (the direction B), the contact surface S4 is inclined by $\delta(°)$ ($\delta \leq 90°$) with respect to the direction B' in which the engagement pin 12 moves relative to the engaging groove portion 11b.

That is, the angles $\gamma$ and $\delta$ are angles determined using the rotating direction as a reference. Further, the engagement pin 12 is fixed in phase so that it may not rotate around a rotation axis determined using the entering direction of the engagement pin 12 as a reference. That is, the two contact surfaces S3 and S4 engaged with the engaging groove portion 11b are always the same, and the surfaces are not changed at the time of operation of the movable member K.

FIG. 9A illustrates the force Fs applied to the engaging groove portion 11b of the arm from the engagement pin 12 by the urging force of the compression spring 13, and the components of the force Fs in the tangential direction and the vertical direction can be respectively expressed as $Fs1=Fs \sin \gamma$ and $Fs2=Fs \cos \delta$. Further, the reaction forces applied to the engagement pin 12 from the engaging groove portion 11b of the arm can be respectively expressed as $Fp1=Fs \sin \gamma$ and $Fp2=Fs \cos \delta$.

FIG. 9B illustrates the force FA applied to the engagement pin 12 when the user rotates the movable member K in the tilting direction (the direction A), and the components of the force in the tangential direction and the vertical direction are as $F1=FA \cos \gamma$ and $F2=FA \sin \delta$.

The engagement pin 12 is fit-engaged with the engaging groove portion 11b at two positions. The contact surface S3 in the direction in which the movable member K is tilted (the direction A), and the contact surface S4 in the direction in which the movable member is erected (the direction B). The engagement pin 12 is held in position when the reaction forces transmitted to the contact surfaces S3 and S4, respectively, are in equilibrium with each other.

That is, in this state, the position of the movable member K and of the arm 11 is maintained. When rotating the movable member K in the tilting direction (the direction A), the movable member K and/or the arm 11 is pressurized, and there is imparted the force $F1=FA \cos \gamma$, which is larger than the component in the tangential direction of the engagement pin 12 of the force applied to the engagement pin 12 from the engaging groove portion 11b, i.e., $Fp1=Fs \sin \gamma$.

As a result, the engagement pin 12 climbs up from the engaging groove portion 11b as illustrated in FIG. 8A. As a result, it is possible for the engagement pin 12 to be fit-engaged with another engaging groove portion 11b. To thus change the engaging groove portion 11b entered by the engagement pin 12, that is, to change the position of the movable member K, the following condition is required:

$$F1=FA \cos \gamma > Fp1 = Fs \sin \gamma$$

From this formula, the requisite force for changing the position of the movable member K can be expressed as follows:

$$FA > Fs \tan \gamma \quad (3)$$

That is, if the urging force Fs of the compression spring 13 is constant, the larger the angle $\gamma$ of the contact surface S3 of the engagement pin 12, the larger the holding force for the movable member K, and the larger the requisite force for changing the position of the movable member K.

Similarly, assuming that the force applied to the engagement pin 12 when rotating the movable member K in the erecting direction (the direction B) is FB, the following force in the direction reverse to that mentioned above is required in changing the position of the movable member K in the erecting direction (the direction B):

$$FB > Fs \tan \delta \quad (4)$$

At this time, as illustrated in FIG. 8B, the engagement pin 12 climbs up from the engaging groove portion 11b. As a result, it is possible to engage the engagement pin 12 with another engaging groove portion 11b.

In this way, in the present exemplary embodiment, the angle $\gamma$ of the contact surface S3 of the engagement pin 12 getting over the regulating surface S1 of the engaging groove portion 11b when moving the movable member K in the tilting direction (the direction A), is set to an angle different from the angle $\delta$ of the contact surface S4 of the engagement pin 12 getting over the regulating surface S2 of the engaging groove portion 11b when moving the movable member K in the erecting direction (the direction B), whereby it is possible to change the operation force according to the rotating direction of the movable member K.

That is, the angle $\gamma$ of the contact surface S3 is set larger than the angle $\delta$ of the contact surface S4, whereby the requisite operation force FA when rotating the movable member K and the arm 11 in the tilting direction, is larger than the requisite force FB when rotating them in the erecting direction.

When put in the form of a formula, the above relationship is to be expressed as: $\gamma > \delta$, so that the following relationship holds true:

$$Fs \tan \gamma > Fs \tan \delta$$

That is, from formulas (3) and (4), FA>FB is satisfied, and it is possible to change the operation force according to the rotating direction of the movable member K. Thus, by properly setting the two slope angles of the engagement pin 12, it is possible to firmly hold the operation panel when performing operation thereon, and to smoothly change the angle thereof when erecting the same.

In this way, in the present exemplary embodiment, the angles $\gamma$ and $\delta$ of the contact surfaces S3 and S4 are made different from each other, whereby the resisting force the holding portion H imparts to the movable member K when changing its position through movement of the movable member K in the tilting direction (the direction A) from the predetermined position, is larger than the resisting force the holding portion H imparts to the movable member K when changing its position through movement of the movable member K in the erecting direction (the direction B) from the predetermined position.

That is, by making the angles $\gamma$ and $\delta$ of the contact surfaces S3 and S4 different from each other, the holding force for holding the movable member K differs according the moving direction of the movable member K.

Thus, as in the first exemplary embodiment, it is possible to attain compatibility between stable retention of the movable member K and smooth change in the installation angle (position) thereof, thereby improving the usability of the movable member K and making the apparatus more satisfactory in terms of usability.

Although in the above two exemplary embodiments the movable member K is equipped with the touch panel 10 serving as both the indicating unit and the operating unit, the movable member K may be equipped with the display serving as the indicating unit, and the button and switch serving as the operating units allowing the user to operate the apparatus, separately or in combination.

Further, the movable member K may be equipped with an attachment unit for attaching external memory such as a memory card.

Further, although in the above two exemplary embodiments (the first exemplary embodiment and the second exemplary embodiment), the movable member K is equipped with the touch panel 10, the movable member K may also be an opening and closing member capable of being opened and closed with respect to the main body of the apparatus 100 and configured to expose the interior of the image forming apparatus 100 to allow replacement of the cartridges for image formation, and dealing with jamming.

Further, in the above two exemplary embodiments (the first exemplary embodiment and the second exemplary embodiment), a plurality of engaging groove portions (recesses) 11b are arranged side by side circumferentially in the sector-shaped disc portion 11a formed integrally with the arm 11, and the engagement pin (protrusion) 12 on the main body of the apparatus 100 side is selectively fit-engaged therewith.

The present invention, however, is also applicable to a configuration in which the sector-shaped disc portion 11a is provided on the main body of the apparatus 100 side, and in which the plurality of engaging groove portions 11b are arranged side by side in the circumferential direction thereof, and the arm 11 is provided with the engagement pin 12, the compression spring 13, and the spring holder 14, with the engagement pin being selectively engaged with the engaging groove portions 11b.

Further, although in the above two exemplary embodiments (the first exemplary embodiment and the second exemplary embodiment), the movable member K rotates around the rotation shaft 11c via the arm 11 to change its position, the movement of the movable member K is not limited to such rotation.

That is, the present invention is applicable to any other configuration so long as the position of the movable member K with respect to the main body of the apparatus is changed through movement of the movable member K in a first direction and in a second direction opposite the first direction.

Figure 11:
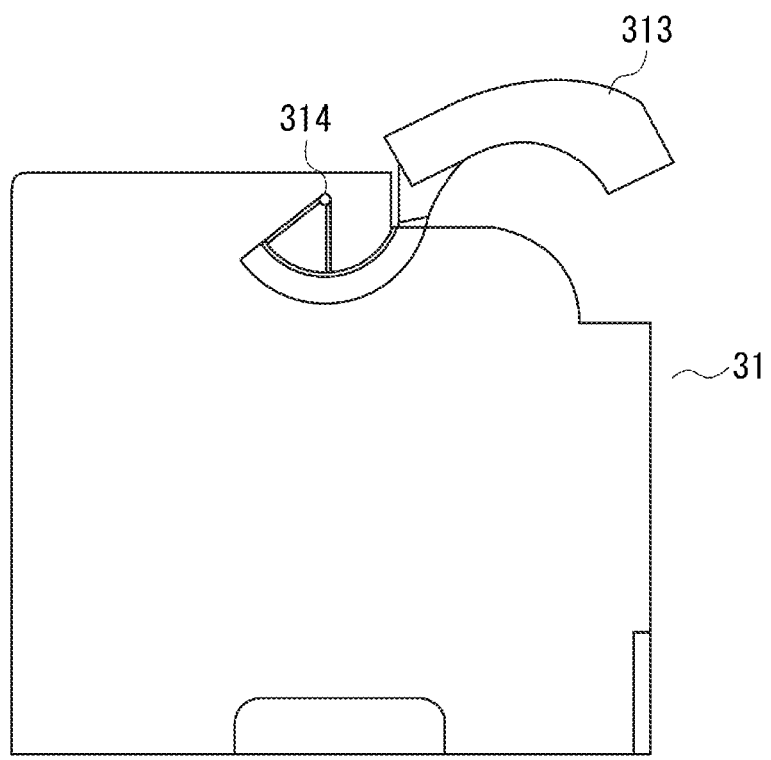
FIG. 11 is an external view of an image forming apparatus.

Next, a third exemplary embodiment of the present invention will be described. FIG. 11 is an external view of an image forming main body of the apparatus 31 (hereinafter referred to as the main body 31) according to the present exemplary embodiment. The internal configuration of the image forming main body of the apparatus 31 is the same as that of the first exemplary embodiment, so that a description thereof is omitted.

At a part of the exterior of the main body 31, there is provided a cover member 313 serving as an opening and closing member allowing exposure of the interior of the main body 31 so that the attachment/detachment of the process cartridge and maintenance operation such as dealing with jamming may be performed. The cover member rotates around a rotation shaft 314, and can be opened and closed with respect to the main body 31, exposing the interior of the main body 31 when it is at a first position where it is open with respect to the main body 31 and closing the main body 31 when it is at a second position where it is closed with respect to the main body 31.

When opening the cover member 313, the cover member 313 is caused to move against its own weight, and when closing the cover member, the cover member 313 is moved in a direction along the weight of the cover member 313 itself. In view of this, there is provided a damper mechanism 3100 (See FIG. 12) for preventing the cover member 313 from being closed with momentum.

Further, due to this damper mechanism 3100, it is possible to hold the opening and closing member at an arbitrary third position between the first position, where it is open with respect to the main body 31, and the second position, where it is closed with respect to the main body.

Figure 12:
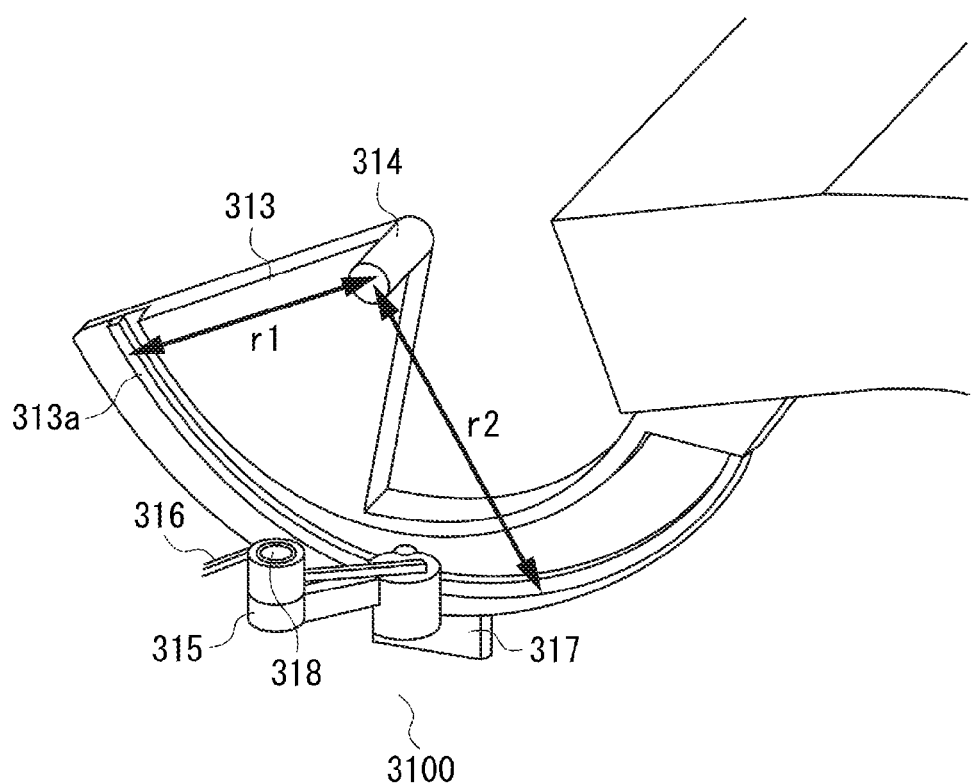
FIG. 12 is a schematic diagram illustrating a damper mechanism 3100.

FIG. 12 is a perspective view of the damper mechanism 3100. The damper mechanism 3100 has a pressurization member 315 pressurizing the cover member 313 and rotatable around a rotation shaft 318 while supported thereby, a spring 316 imparting a pressurizing force to the pressurization member 315, and a receiving member 317 configured to hold the cover member 313 between itself and the pressurization member 315. Due to the action of the spring 316, the pressurization member 315 is held in contact with the cover member 313, and pressurizes the same toward the receiving member 317.

Due to this configuration, the frictional force between the cover member 313 and the pressurization member 315, and the frictional force between the cover member 313 and the receiving member 317, constitute a load (resisting force or holding force) hindering the movement of the cover member 313, preventing the cover member 313 from moving with momentum.

Further, because of this load due to the frictional forces, it is possible to hold the cover member 313 at an arbitrary third position. Due to the configuration in which the cover member 313 is held between the pressurization member 315 and the receiving member 317, it is possible to mitigate torsion and rattling of the cover member 313.

Further, integrally formed on the cover member 313 is a pressurized portion 313a held between and in contact with the pressurization member 315 and the receiving member 317.

The pressurized portion 313a is formed in such a manner that the radius (distance) as measured from the rotation shaft 314 gradually increases from r1 to r2 (r2>r1). Thus, the distance from the rotation shaft 314 of the portion of the pressurized portion 313a held in contact with the pressurization member 315 gradually increases as the cover member 313 is closed.

With this configuration, as the cover member 313 is closed, the frictional force between the pressurization member 315 and the cover member 313 acting on the cover member 313 as the moment around the rotation shaft 314 gradually increases. Thus, the smaller the opening angle of the cover member 313, the higher the holding effect of the damper mechanism 3100.

Figure 13A:
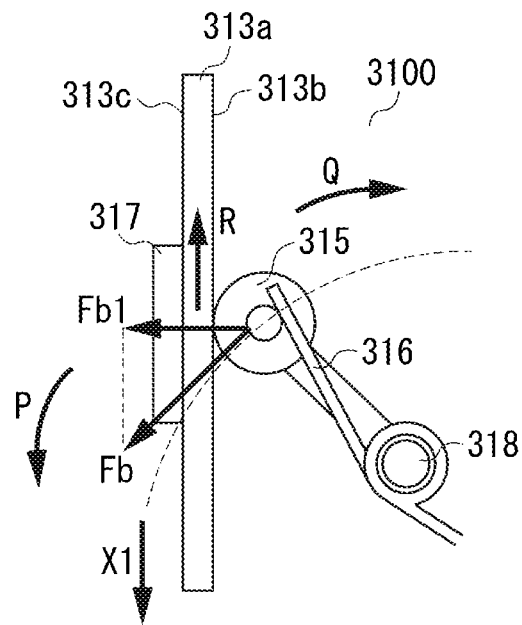
FIG. 13A is a detailed view of the damper mechanism 3100.

FIGS. 13A to 13D are diagrams illustrating the damper mechanism 3100 as seen in the direction of the rotation shaft 318 of the pressurization member 315. As illustrated in FIG. 13A, the pressurization member 315 has a rotation fulcrum (rotation shaft) 318, and one of the directions in which the pressurization member 315 is allowed to move is the direction (direction P) in which the pressurization member 315 is pressed against the pressurized portion 313a of the cover member 313.

The other direction in which the pressurization member 315 is allowed to move is the direction (direction Q) in which the pressurization member 315 moves away from the pressurized portion 313a of the cover member 313. A surface 13b of the pressurized portion 313a held in contact with the pressurization member 315, and a surface 13c of the pressurized portion 313a held in contact with the receiving member 317 are parallel to the moving direction of the pressurized portion 313a, and both of the surfaces are orthogonal to the rotation shaft 314 of the cover member 313.

Due to the action of the spring force Fb of the spring 316, the pressurization member 315 is pressurized in a direction P. As a result, the pressurization member 315 pressurizes the pressurized portion 313a with a force Fb1 in the direction of the normal of the surface 13b and 13c (i.e., in the direction of the rotation shaft 314). Thus, when an attempt is made to move the cover member 313 in the closing direction (direction X1 as seen in the diagram), a frictional force R is exerted in proportion to the force Fb1.

Figure 13B:
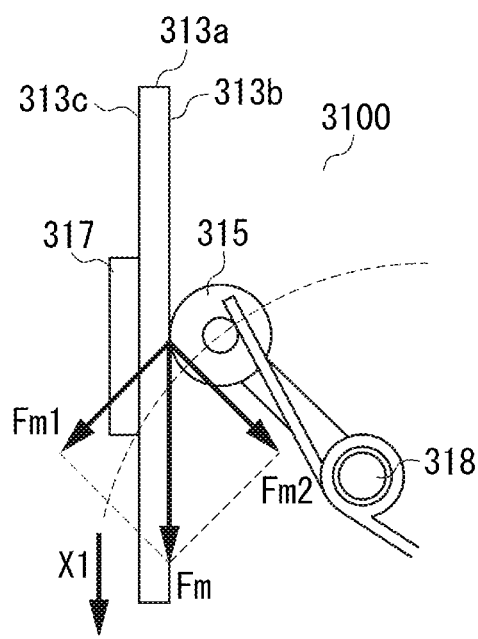
FIG. 13B is a detailed view of the damper mechanism 3100.

FIG. 13B illustrates the force the pressurization member 315 receives from the pressurized portion 313a when the cover member 313 strives to move in the closing direction (direction X1). At this time, a frictional force Fm, which is the reaction force of the frictional force R, is exerted on the pressurization member 315 in the direction X1.

Figure 13C:
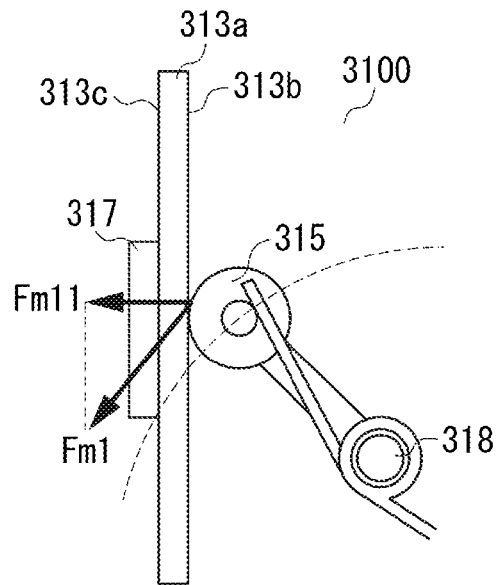
FIG. 13C is a detailed view of the damper mechanism 3100.

This frictional force Fm can be divided into a component Fm1 in the tangential direction and a component Fm2 in the direction of the rotation shaft, and as illustrated in FIG. 13C, there is generated a force Fm11, which is the component in the direction of the normal of the surfaces 13b and 13c of the cover member 313.

The component force Fm2 in the direction of the rotation shaft is canceled by the reaction from the rotation shaft 318. As a result, the force exerted on the pressurized portion 313a in the direction of the normal of the surface 13b and 13c is Fb1+Fm11, which means an increase in the frictional force R.

In this way, when the cover member 313 is moved in the direction X1, there is generated a force Fm11 pressing the pressurization member 315 against the cover member 313 due to the frictional force between the pressurized portion 313a and the pressurization member 315, so that the pressurization force due to the pressurization member 315 increases.

As a result, eventually, the frictional force R striving to hinder the movement of the cover member 313 increases. In this way, when moving the cover member in the opening direction (the direction X1), the damper mechanism 3100 is placed in a so-called interlock-possible state, and the holding force with which the cover member 313 becomes relatively large.

Figure 13D:
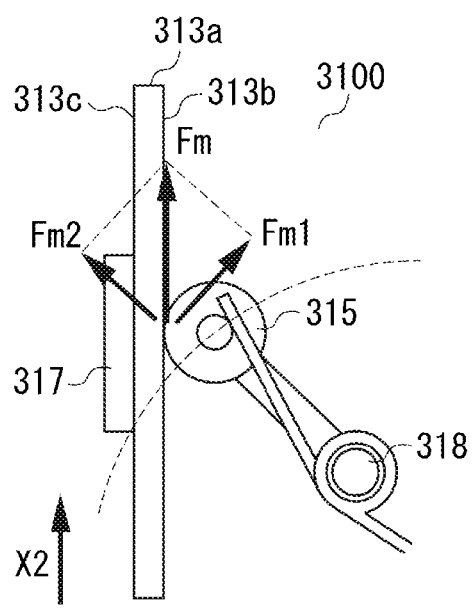
FIG. 13D is a detailed view of the damper mechanism 3100.

On the other hand, as illustrated in FIG. 13D, when the cover member 313 moves in the opening direction (a direction X2 as indicated in FIG. 13D), the pressurization member 315 receives a force which causes thereof to move away from the cover member 313 due to the component force Fm1 in the tangential direction of the frictional force Fm received from the pressurized portion 313a.

As a result, the pressurization force with which the pressurized portion 313a is pressurized in the direction of the normal of the surfaces 13b and 13c decreases, and, eventually, the frictional force striving to hinder the movement of the cover member 313 decreases. In this way, when the cover member is moved in the closing direction (in the direction X2), the damper mechanism 3100 is placed in a so-called relief-possible state. Therefore, the holding force with which the cover member 313 is held becomes relatively small.

The damper mechanism 3100 is placed in the interlock-possible state or the relieve-possible state mentioned above because, when closing the cover member 313, the rotation shaft 318 of the pressurization member 315 is positioned on the downstream side of the pressurized portion 313a with respect to the direction in which the pressurized portion 313a moves at the position where the pressurization member 315 and the pressurized portion 313a are held in contact with each other.

Although in the present exemplary embodiment the pressurized portion 313a is formed such that the radius (distance) from the rotation shaft 314 gradually increases from r1 to r2 (r2>r1), it is also possible for the radius of the pressurized portion 313a to be fixed all over. Alternatively, it is also possible to adopt a configuration in which the radius gradually changes in a part of the pressurized portion, with the radius of the remaining part being fixed.

In the present exemplary embodiment, the rotation shaft 314 of the cover member 313 and the rotation shaft 318 of the pressurization member 315 are in an orthogonal or twisted relationship.

In this way, in the present exemplary embodiment, the frictional force acting as the holding force for the cover member 313 and hindering the movement of the cover member differs between the case where the cover member 313 is closed and the case where it is opened.

More specifically, the frictional force (holding force) is smaller when the cover member 313 at a predetermined position (third position) is moved against the gravitational force (i.e., when the cover member 313 moves at least vertically upwards as a result of this movement) than when the cover member is moved along the gravitational force (i.e., when the cover member 313 moves at least vertically downwards as a result of this movement).

In other words, the requisite force for starting the movement of the cover member is smaller when the cover member 313 at a predetermined position (third position) is moved against the gravitational force (i.e., when the cover member 313 moves at least vertically upwards as a result of this movement) than when the cover member is moved along the gravitational force (i.e., when the cover member 313 moves at least vertically downwards as a result of this movement).

As a result, it is possible to achieve an improvement in terms of operability when moving the cover member 313 against the gravitational force.

Further, although, in the present exemplary embodiment described above, the movable member movable with respect to the main body 31 is the cover member 313, the application of the damper mechanism 3100 of the present exemplary embodiment is not limited to the holding portion for the cover member 313.

That is, the present exemplary embodiment is also applicable to the portion holding the operating unit provided with a button, touch panel, display enabling the user to control the image forming operation as illustrated in the first exemplary embodiment.

In this case, the operation is to be performed such that the frictional force (holding force) increases when moving the operating unit along the direction in which the user depresses the button of the operating unit, and that the frictional force (holding force) decreases when moving the operating unit in the opposite direction.

Next, a fourth exemplary embodiment will be described. The configuration of the image forming apparatus as a whole and the configuration of the cover member 313 are the same as those of the third exemplary embodiment, so that a description thereof will be omitted. Also regarding other portions, the portions similar to those of the third exemplary embodiment are designated by the identical reference numerals, and a description thereof will be omitted.

Figure 14:
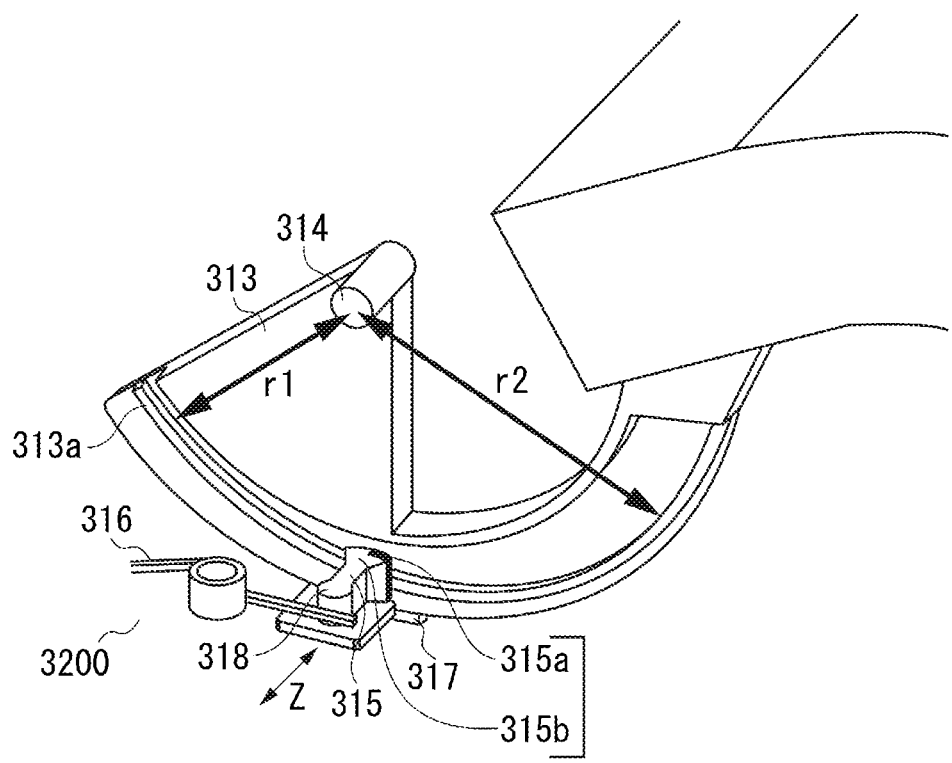
FIG. 14 is a schematic diagram illustrating a damper mechanism 3200.

FIG. 14 is a perspective view of a damper mechanism 3200. The feature of the present exemplary embodiment lies in the fact that the portion of the pressurization member 315 to be brought into contact with the pressurized portion 313a differs according to the moving direction of the cover member 313.

That is, the pressurization member is equipped with a first pressurization portion (first contact portion) 315a to be brought into contact with the pressurized portion 313a when closing the cover member 313, and a second pressurization portion (second contact portion) 315b to be brought into contact with the pressurized portion 313a when opening the cover member 313.

Further, the second pressurization portion 315b is formed of a material whose friction coefficient with respect to the pressurized portion 313a is smaller than that of the material of which the first pressurization portion 315a is formed. As in the third exemplary embodiment, the pressurized portion 313a is formed such that the distance from the rotation shaft 314 increases gradually from r1 to r2, i.e., the smaller the opening angle of the cover member 313, the higher the holding effect of the damper mechanism 3200.

Figure 15A:
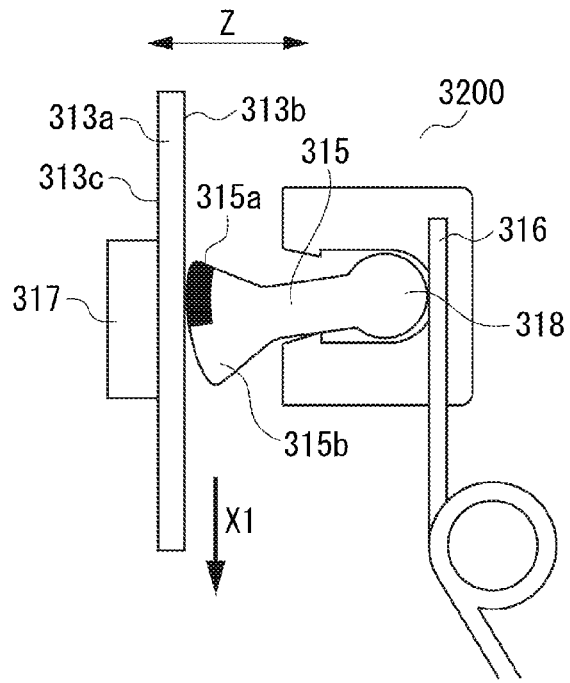
FIG. 15A is a detailed view of the damper mechanism 3200.
Figure 15B:
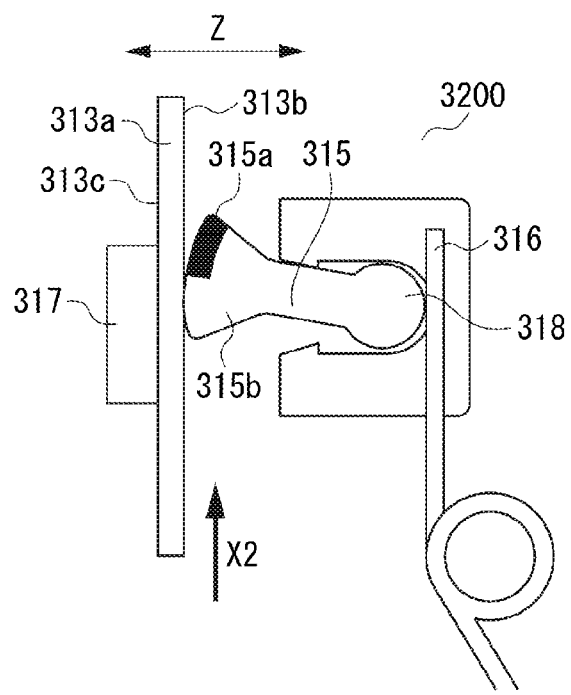
FIG. 15B is a detailed view of the damper mechanism 3200.

Next, the damper mechanism 3200 will be described. FIGS. 15A and 15B are diagrams illustrating the damper mechanism 3200 as seen from the direction of the rotation shaft 318 of the pressurization member 315.

The pressurization member 315 is rotatable around the rotation shaft 318, and the rotation shaft 318 itself is movable in a direction Z (the direction of the rotation shaft 13 of the cover member 313). The pressurization member 315 is pressurized in the direction Z by the spring 316.

FIG. 15A illustrates the position of the pressurization member 315 when the cover member 313 is operated in the closing direction (in direction X1 as seen in the diagram), and the pressurized portion 313a is in contact with the first pressurization portion 315a.

On the other hand, as illustrated in FIG. 15B, when the cover member 313 is moved in the direction in which the cover is opened (in the direction X2 as seen in the diagram), the pressurization member 315 changes its position, and the second pressurization portion 315b thereof comes into contact with the pressurized portion 313a. And, the second pressurization portion 315b is formed of a material of a smaller friction coefficient with respect to the pressurized portion 313a than that of the material of which the first pressurization portion 315b is formed.

As a result, the load due to the frictional force is smaller in the case where the cover member 313 is operated in the opening direction than in the case where it is operated in the closing direction.

In the present exemplary embodiment, the rotation shaft 314 of the cover member 314 and the rotation shaft 318 of the pressurization member 315 are in an orthogonal or a twisted relationship.

In this way, as in the third exemplary embodiment, in the present exemplary embodiment, the frictional force acting as the holding force for the cover member 313 and hindering the movement of the cover member differs between the case where the cover member 313 is closed and the case where it is opened.

More specifically, the frictional force (holding force) when the cover member 313 at the predetermined position (third position) is moved at least vertically upwards as a result of this movement, is smaller than the frictional force when the cover member 313 is moved at least vertically downwards as a result of this movement.

In other words, the requisite force for starting the movement of the cover member 313 when the cover member 313 at the predetermined position (third position) is moved at least vertically upwards as a result of this movement, is smaller than that when the cover member 313 is moved at least vertically downwards as a result of this movement.

As a result, it is possible to achieve an improvement in terms of operability when moving the cover member 313 against the gravitational force.

Further, although, in the present exemplary embodiment described above, the movable member movable with respect to the main body 31 is the cover member 313, the application of the damper mechanism 3200 of the present exemplary embodiment is not limited to the holding portion for the cover member 313.

That is, the present exemplary embodiment is also applicable to the portion holding the operating unit provided with a button, touch panel, display, and the like enabling the user to control the image forming operation as described in the first exemplary embodiment.

In this case, the frictional force (holding force) may be set to increase when moving the operating unit along the direction in which the user depresses the button of the operating unit, and the frictional force (holding force) may be set to decrease when moving the operating unit in the opposite direction.

Further, in the present exemplary embodiment, it is possible to easily perform the adjustment of the frictional force and to properly set the holding force by employing different materials for the first pressurization portion 315a and the second pressurization portion 315b.

Next, a fifth exemplary embodiment will be described. The configuration of the image forming apparatus as a whole and the configuration of the cover member 313 is the same as those of the third exemplary embodiment, so that a description thereof will be omitted. Regarding other portions, the portions similar to those of the third exemplary embodiment are designated by the identical reference numerals, and a description thereof will be omitted.

Figure 16:
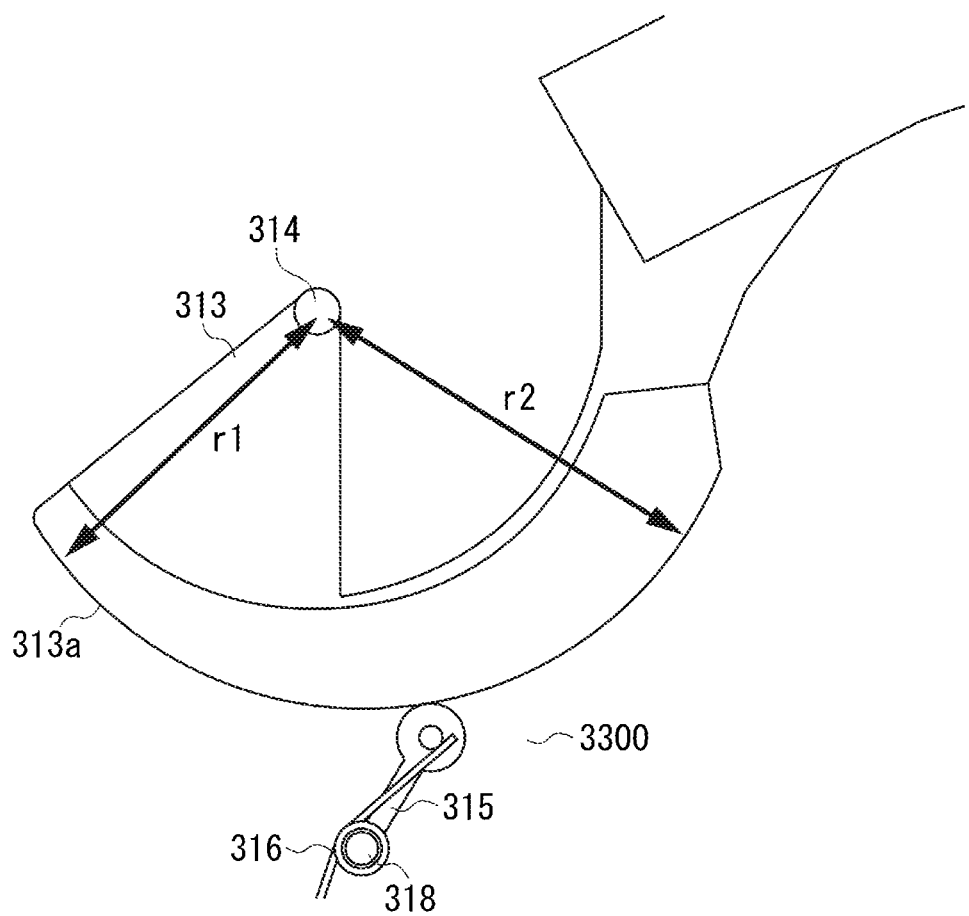
FIG. 16 is a schematic diagram illustrating a damper mechanism 3300.
Figure 17A:
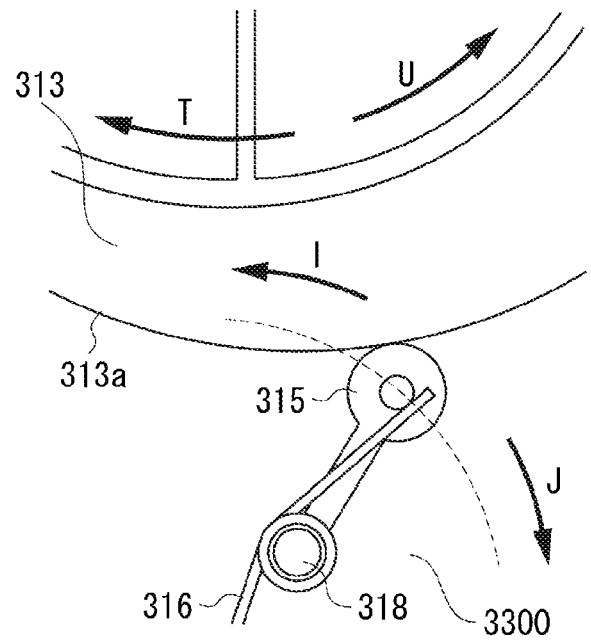
FIG. 17A is a detailed view of the damper mechanism 3300.
Figure 17B:
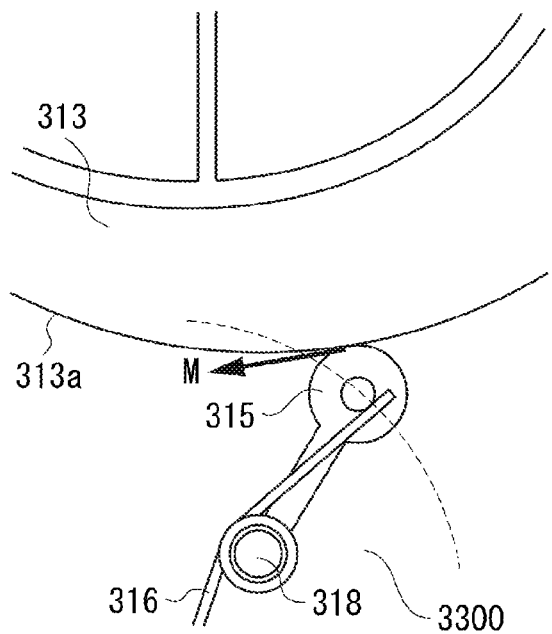
FIG. 17B is a detailed view of the damper mechanism 3300.
Figure 17C:
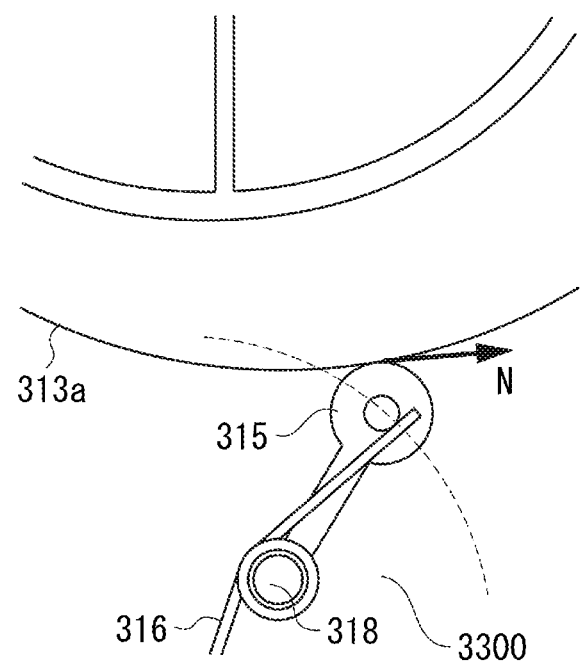
FIG. 17C is a detailed view of the damper mechanism 3300.

FIG. 16 is a schematic diagram illustrating a damper mechanism 3300. The feature of the present exemplary embodiment lies in the fact that the direction in which the pressurization member 315 pressurizes the pressurized portion 313a of the cover member 313 is a direction orthogonal to the rotation shaft 314 of the cover member 313.

That is, in the present exemplary embodiment, the rotation shaft 314 of the cover member 313 and the rotation shaft 318 of the pressurization member 315 are substantially parallel to each other, and pressurization is effected with the cover member 313 being held between the pressurization member and the rotation shaft 314.

As in the third exemplary embodiment, in the present exemplary embodiment, the pressurized portion 313a is formed in such a manner that the distance from the rotation shaft 314 of the cover member 313 gradually increases from r1 to r2, and the smaller the opening angle of the cover member 313, the higher the holding effect of the damper mechanism 3300.

Further, in the present exemplary embodiment, the pressurization member 315 pressurizes the pressurized portion 313a in a direction orthogonal to the rotation shaft 314 of the cover member 313, so that, as the cover member 313 is being closed, the pressurizing force of the spring 15 increases, resulting in an increase in load.

Thus, the smaller the opening angle of the cover member 313, the higher the holding effect of the damper mechanism 3300 can be enhanced.

FIG. 16A illustrates in detail the holding configuration of the pressurization member 315. The pressurization member 315 has a rotation fulcrum 318, and is allowed to move in two directions. One is the direction (a direction I) in which the pressurization member 315 pressurizes the cover member 313, and the other is the direction (a direction J) in which the pressurization member moves away from the cover member 313.

FIG. 16B illustrates the force applied to the pressurization member 315 when the cover member 313 moves in the closing direction (direction T in the diagram). As in the third embodiment, the frictional force M acting on the pressurization member 315 strives to move so as to press the pressurization member 315 against the cover member 313, resulting in an increase in pressurization force. Thus, the damper mechanism is placed in a so-called interlock-possible state.

FIG. 16C illustrates the force applied to the pressurization member 315 in the case where the cover member 313 moves in the opening direction (a direction U in the diagram). The frictional force acting on the pressurization member 315 strives to move the pressurization member 315 away from the cover member 313, and the pressurizing force is reduced, resulting in a so-called relief-possible state.

Thus, when the cover member 313 is moved against the gravitational force, the load due to the frictional force is smaller than that when it is moved along the gravitational force. Accordingly, it is possible to achieve an improvement in terms of operational feeling when operating the cover member 313 against the gravitational force.

The damper mechanism is placed in the above-mentioned interlock-possible state or relief-possible state because, when the cover member 313 is closed, the rotation shaft 318 of the pressurization member 315 is on the downstream side of the pressurized portion 313a with respect to the moving direction of the pressurized portion 313a at the position where the pressurization member 315 is held in contact with the pressurized portion 313a.

Figure 18:
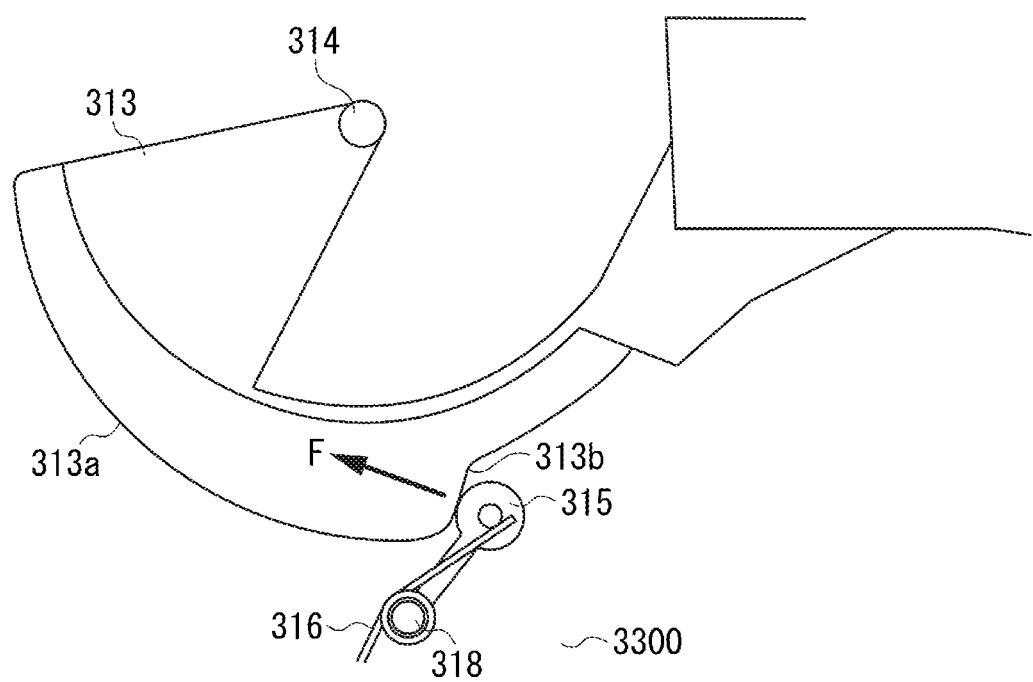
FIG. 18 is a schematic diagram illustrating the damper mechanism 3300.

Further, as illustrated in FIG. 18, it is also possible to provide a slope 13b on the pressurized portion 313a of the cover member 313. Due to this configuration, immediately before the cover member 313 is completely closed, the pressurization force F of the pressurization member 315 is exerted so as to close the cover member 313, whereby the cover member 313 is drawn in and can be reliably closed.

Further, it is also possible to prevent the cover member 313 from abutting to and bouncing from the main body of the apparatus 31 when it is closed.

In this way, as in the third exemplary embodiment, in the present exemplary embodiment, the frictional force acting as the holding force for the cover member 313 and preventing movement of the cover member differs between the case where the cover member 313 is closed and the case where it is opened.

More specifically, the frictional force (holding force) when the cover member 313 at the predetermined position (third position) is moved at least vertically upwards as a result of this movement, is smaller than the frictional force (holding force) when the cover member 313 is moved at least vertically downwards as a result of this movement.

In other words, the requisite force for starting the movement of the cover member 313 when the cover member 313 at the predetermined position (third position) is moved at least vertically upwards as a result of this movement, is smaller than that when the cover member 313 is moved at least vertically downwards as a result of this movement.

As a result, it is possible to achieve an improvement in terms of operability when moving the cover member 313 against the gravitational force.

Further, although, in the present exemplary embodiment described above, the movable member movable with respect to the main body 31 is the cover member 313, the application of the damper mechanism 3300 of the present exemplary embodiment is not limited to the holding portion for the cover member 313.

That is, the present exemplary embodiment is also applicable to the portion holding the operating unit provided with a button, touch panel, display, and the like enabling the user to control the image forming operation as illustrated in the first exemplary embodiment.

In this case, the frictional force (holding force) is set to increase when moving the operating unit along the direction in which the user depresses the button, and the like of the operating unit, and the frictional force (holding force) is set decrease when moving the operating unit in the opposite direction.

Further, although the above exemplary embodiment described above is applied to an image forming apparatus configured to perform monochrome image formation, it is also applicable to an image forming apparatus configured to perform multi-color image formation. Further, if not an electrophotographic image forming apparatus, the exemplary embodiment is also applicable to any other type of image forming apparatus such as an ink-jet type one so long as it forms an image on a sheet.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-122751 filed May 31, 2011, and No. 2012-096083 filed Apr. 19, 2012, which are hereby incorporated by reference herein in their entirety.

What is claimed is:

1. An image forming apparatus comprising:
   a movable member including an operating unit for operating the image forming apparatus, and a rotation shaft; and
   a holding unit configured to hold the movable member,
   wherein the movable member is capable of moving between a first position and a second position by using the rotation shaft to rotate with respect to the holding unit, and the movable member is held in a predetermined position when one of the movable member and the holding unit is pressed, in a longitudinal direction of the rotation shaft, against the other of the movable member and the holding unit,
   wherein a direction in which the operating unit is pressed in order to operate the image forming apparatus is a direction in which the movable member is pressed when a position of the movable member is changed from the first position to the second position, and
   wherein the holding unit holds the movable member so that a requisite force for changing the position of the movable member from the first position to the second position is larger than a requisite force for changing the position of the movable member from the second position to the first position.

2. The image forming apparatus according to claim 1, wherein one of the movable member and the holding unit is provided with a plurality of recesses arranged side by side, and the other of the movable member and the holding unit is provided with a protrusion capable of fit-engagement with each of the plurality of recesses, and
   wherein the movable member is held in the predetermined position with the protrusion fit-engaged with one of the plurality of recesses.

3. The image forming apparatus according to claim 2, wherein, in each of the plurality of recesses, regulating surfaces configured to regulate releasing of the fit-engagement of the protrusion and the recess to hold the protrusion are formed, wherein the movable member moves from a state in which the protrusion is fit-engaged with the recess, and the protrusion moves with respect to the recess, whereby the protrusion climbs over a regulating surface to release the fit-engagement with the recess to become capable of fit-engagement with another of the plurality of recesses, and wherein, assuming that, of the regulating surfaces, the regulating surface the protrusion climbs over when the movable member is placed in the second position from the first position is a first regulating surface, that the regulating surface the protrusion climbs over when the movable member is placed in the first position from the second position is a second regulating surface, and that the angles of the first regulating surface and the second regulating surface with respect to the moving direction of the protrusion with respect to the recess are $\alpha$ and $\beta$, respectively ($\alpha$, $\beta \leq 90°$), the angles $\alpha$ and $\beta$ satisfy the $\alpha > \beta$ so that it can be more difficult for the protrusion to climb over the first regulating surface than to climb over the second regulating surface.

4. The image forming apparatus according to claim 2, wherein, in the recess, regulating surfaces configured to regulate the releasing of the fit-engagement of the protrusion and to hold the protrusion are formed, and on the protrusion, contact surfaces configured to be brought into contact with the regulating surfaces are formed, wherein the movable member moves and the protrusion moves with respect to the recess from the state in which the protrusion is fit-engaged with the recess, whereby the contact surfaces climb over the regulating surfaces to release the fit-engagement with the recess, making it possible for the protrusion to be fit-engaged with another recess, and wherein, assuming that, of the contact surfaces, the contact surface which comes into contact with the regulating surface and climbs over the regulating surface when the movable member is placed in the second position from the first position is a first contact surface, that the contact surface which comes into contact with the regulating surface and climbs over the regulating surface when the movable member is placed in the first position from the second position is a second contact surface, and that the respective angles of the first contact surface and the second contact surface with respect to the moving direction of the protrusion with respect to the recess are $\gamma$ and $\delta$ ($\gamma$, $\delta \leq 90°$), the angles $\gamma$ and $\delta$ satisfy $\gamma > \delta$, so that it may be more difficult for the protrusion to climb over the first regulating surface than the second regulating surface.

5. The image forming apparatus according to claim 3, wherein as the movable member is moved so that the position of the movable member can be placed in the second position from the first position, the moving direction of the movable member becomes parallel to a vertical downward direction, and wherein the angle $\alpha$ of the first regulating surface increases as the movable member becomes closer to the second position.

6. The image forming apparatus according to claim 3, further comprising a pressing member configured to press the protrusion in the direction of the rotation shaft of the movable member.

7. The image forming apparatus according to claim 3, wherein as the movable member is moved so that the position of the movable member can be placed in the first position from the second position, the moving direction of the movable member becomes parallel to a horizontal direction, and wherein the angle $\beta$ of the second regulating surface increases as the movable member becomes closer to the first position.

8. The image forming apparatus according to claim 1, wherein the operating unit includes a touch panel and pressing the touch panel is to press the operation unit for operating the image forming apparatus.

9. An image forming apparatus comprising:

a movable member including an operating unit for operating the image forming apparatus, and a rotation shaft; and a holding unit configured to hold the movable member, wherein the movable member is capable of moving between a first position and a second position by using the rotation shaft to rotate with respect to the holding unit, and the movable member is held in a predetermined position when one of the movable member and the holding unit is pressed, in a longitudinal direction of the rotation shaft, against the other of the movable member and the holding unit, wherein one of the movable member and the holding unit is provided with a plurality of recesses arranged side by side, and the other of the movable member and the holding unit is provided with a protrusion capable of fit-engagement with each of the plurality of recesses, wherein each of the plurality of recesses has regulating surfaces configured to regulate releasing of the fit-engagement of the protrusion and the recess and to hold the protrusion, wherein the movable member is maintained in the predetermined position in a state in which the protrusion is fit-engaged with the recess, and the movable member moves from the state in which the protrusion is fit-engaged with the recess, with the protrusion moving with respect to the recess, whereby the protrusion climbs over a regulating surface to release the fit-engagement with the recess to become capable of fit-engagement with another of the plurality of recesses, wherein a direction in which the operating unit is pressed in order to operate the image forming apparatus is a direction in which the movable member is pressed when a position of the movable member is changed from the first position to the second position, and wherein, assuming that, of the regulating surfaces, the regulating surface the protrusion climbs over when the movable member is placed in the second position from the first position is a first regulating surface, that the regulating surface the protrusion climbs over when the movable member is placed in the first position from the second position is a second regulating surface, and that the angles of the first regulating surface and the second regulating surface with respect to the moving direction of the protrusion with respect to the recess are $\alpha$ and $\beta$, respectively ($\alpha$, $\beta \leq 90°$), the angles $\alpha$ and $\beta$ satisfy $\alpha > \beta$, so that it can be more difficult for the protrusion to climb over the first regulating surface than to climb over the second regulating surface.

10. The image forming apparatus according to claim 9, further comprising a pressing member configured to press the protrusion in the direction of the rotation shaft of the movable member.

11. The image forming apparatus according to claim 9, wherein the operating unit includes a touch panel and pressing the touch panel is to press the operation unit for operating the image forming apparatus.

12. An image forming apparatus comprising:
a movable member including an operating unit for operating the image forming apparatus, and a rotation shaft; and
a holding unit configured to hold the movable member,
wherein the movable member is capable of moving, with respect to the holding unit, to a first direction and a second direction opposite to the first direction, and the movable member is held in a predetermined position when one of the movable member and the holding unit is pressed, in a longitudinal direction of the rotation shaft, against the other of the movable member and the holding unit,
wherein the operating unit is pressed in the first direction in order to operate the image forming apparatus, and
wherein in a case where the movable member placed in the predetermined position is moved with respect to the holding unit, a resistance force received by the movable member from the holding unit to prevent the movable member from being moved with respect to the holding unit is larger when the movable member is moved from the predetermined position to the first direction than when the movable member is moved from the predetermined position to the second direction.

13. The image forming apparatus according to claim 12, wherein one of the movable member and the holding unit is provided with a plurality of recesses arranged side by side, and the other of the movable member and the holding unit is provided with a protrusion capable of fit-engagement with each of the plurality of recesses, wherein the movable member is held in the predetermined position with the protrusion fit-engaged with one of the plurality of recesses.

14. The image forming apparatus according to claim 13, wherein, in each of the plurality of recesses, regulating surfaces configured to regulate releasing of the fit-engagement of the protrusion and the recess to hold protrusion are formed,
wherein the movable member moves from a state in which the protrusion is fit-engaged with the recess, and the protrusion moves with respect to the recess, whereby the protrusion climbs over a regulating surface to release the fit-engagement with the recess to become capable of fit-engagement with another of the plurality of recesses, and
wherein, assuming that, of the regulating surfaces, the regulating surface the protrusion climbs over when the movable member is moved in the first direction from the predetermined positions is a first regulating surface, that the regulating surface the protrusion climbs over when the movable member is moved in the second direction from the predetermine position is a second regulating surface, and that the angles of the first regulating surface and the second regulating surface with respect to the moving direction of the protrusion with respect to the recess are α and β, respectively (α, β≤90°), the angles α and β satisfy the α<β so that it can be more difficult for the protrusion to climb over the first regulating surface than to climb over the second regulating surface.

15. The image forming apparatus according to claim 14, further comprising a pressing member configured to press the protrusion in the direction of the rotation shaft of the movable member.

16. The image forming apparatus according to claim 12, wherein the second direction becomes closer to a direction parallel to a horizontal direction,
wherein the movable member moves from the predetermined position to a second predetermined position by moving in the second direction, and
wherein the resistance force when the movable member is at a second predetermined position is larger than the resistance force when the movable member is at the predetermined position.

17. The image forming apparatus according to claim 12, wherein the first direction becomes closer to a direction parallel to a vertical downward direction,
wherein the movable member moves from the predetermined position to a third predetermined position by moving in the first direction, and
wherein the resistance force when the movable member is at a third predetermined position is larger than the resistance force when the movable member is at the predetermined position.

18. The image forming apparatus according to claim 12, wherein the operating unit includes a touch panel and pressing the touch panel is to press the operation unit for operating the image forming apparatus.

19. An image forming apparatus comprising:
a movable member comprising a rotation shaft; and
a holding unit configured to hold the movable member,
wherein the movable member is capable of moving between a first position and a second position by using the rotation shaft to rotate with respect to the holding unit, and the movable member is held in a predetermined position when one of the movable member and the holding unit is pressed, in a longitudinal direction of the rotation shaft, against the other of the movable member and the holding unit, and
wherein the holding unit holds the movable member such that a requisite force for changing the position of the movable member from the first position to the second position is larger than a requisite force for changing the position of the movable member from the second position to the first position.

20. The image forming apparatus according to claim 19, wherein one of the movable member and the holding unit is provided with a plurality of recesses arranged side by side, and the other of the movable member and the holding unit is provided with a protrusion capable of fit-engagement with each of the plurality of recesses, and
wherein the movable member is held in the predetermined position with the protrusion fit-engaged with one of the plurality of recesses.

21. The image forming apparatus according to claim 20, wherein, in each of the plurality of recesses, regulating surfaces configured to regulate releasing of the fit-engagement of the protrusion and the recess to hold the protrusion are formed,
wherein the movable member moves from a state in which the protrusion is fit-engaged with the recess, and the protrusion moves with respect to the recess, whereby the protrusion climbs over a regulating surface to release the fit-engagement with the recess to become capable of fit-engagement with another of the plurality of recesses, and wherein, assuming that, of the regulating surfaces, the regulating surface the protrusion climbs over when the movable member is placed in the second position from the first position is a first regulating surface, that the regulating surface the protrusion climbs over when the movable member is placed in the first position from the second position is a second regulating surface, and that the angles of the first regulating surface and the second regulating surface with respect to the moving direction of the protrusion with respect to the recess are α and β, respectively (α, β≤90°), the angles α and β satisfy the α>β so that it can be more difficult for the protrusion to climb over the first regulating surface than to climb over the second regulating surface.

22. The image forming apparatus according to claim 20, wherein, in the recess, regulating surfaces configured to regulate the releasing of the fit-engagement of the protrusion and to hold the protrusion are formed, and on the protrusion, contact surfaces configured to be brought into contact with the regulating surfaces are formed,
wherein the movable member moves and the protrusion moves with respect to the recess from the state in which the protrusion is fit-engaged with the recess, whereby the contact surfaces climb over the regulating surfaces to release the fit-engagement with the recess, making it possible for the protrusion to be fit-engaged with another recess, and wherein, assuming that, of the contact surfaces, the contact surface which comes into contact with the regulating surface and climbs over the regulating surface when the movable member is placed in the second position from the first position is a first contact surface, that the contact surface which comes into contact with the regulating surface and climbs over the regulating surface when the movable member is placed in the first position from the second position, is a second contact surface, and that the respective angles of the first contact surface and the second contact surface with respect to the moving direction of the protrusion with respect to the recess are γ and δ (γ, δ≤90°), the angles γ and δ satisfy γ>δ, so that it may be more difficult for the protrusion to climb over the first regulating surface than the second regulating surface.

23. The image forming apparatus according to claim 21, wherein as the movable member is moved so that the position of the movable member can be placed in the second position from the first position, the moving direction of the movable member becomes parallel to a vertical downward direction, and wherein the angle a of the first regulating surface increases as the movable member becomes closer to the second position.

24. The image forming apparatus according to claim 21, wherein as the movable member is moved so that the position of the movable member can be placed in the first position from the second position, the moving direction of the movable member becomes parallel to a horizontal direction, and
wherein the angle β of the second regulating surface increases as the movable member becomes closer to the first position.

25. An image forming apparatus comprising:
a movable member comprising a rotation shaft; and
a holding unit configured to hold the movable member,
wherein the movable member is capable of moving, with respect to the holding unit, to a first direction and a second direction opposite to the first direction, and the movable member is held in a predetermined position when one of the movable member and the holding unit is pressed, in a longitudinal direction of the rotation shaft, against the other of the movable member and the holding unit, and
wherein in a case where the movable member placed in the predetermined position is moved with respect to the holding unit, a resistance force received by the movable member from the holding unit to prevent the movable member from being moved with respect to the holding unit is larger when the movable member is moved from the predetermined position to the first direction than when the movable member is moved from the predetermined position to the second direction.

26. The image forming apparatus according to claim 25, wherein one of the movable member and the holding unit is provided with a plurality of recesses arranged side by side, and the other of the movable member and the holding unit is provided with a protrusion capable of fit-engagement with each of the plurality of recesses, wherein the movable member is held in the predetermined position with the protrusion fit-engaged with one of the plurality of recesses.

27. The image forming apparatus according to claim 26, wherein, in each of the plurality of recesses, regulating surfaces configured to regulate releasing of the fit-engagement of the protrusion and the recess to hold the protrusion are formed,
wherein the movable member moves from a state in which the protrusion is fit-engaged with the recess, and the protrusion moves with respect to the recess, whereby the protrusion climbs over a regulating surface to release the fit-engagement with the recess to become capable of fit-engagement with another of the plurality of recesses, and
wherein, assuming that, of the regulating surfaces, the regulating surface the protrusion climbs over when the movable member is moved in the first direction from the predetermined position is a first regulating surface, that the regulating surface the protrusion climbs over when the movable member is moved in the second direction from the predetermine position is a second regulating surface, and that the angles of the first regulating surface and the second regulating surface with respect to the moving direction of the protrusion with respect to the recess are α and β, respectively (α, β≤90°), the angles α and β satisfy the α>β so that it can be more difficult for the protrusion to climb over the first regulating surface than to climb over the second regulating surface.

28. The image forming apparatus according to claim 27, further comprising a pressing member configured to press the protrusion in the direction of the rotation shaft of the movable member.

29. The image forming apparatus according to claim 25, wherein the second direction becomes closer to a direction parallel to a horizontal direction,
wherein the movable member moves from the predetermined position to the second predetermined position by moving in a second direction, and
wherein the resistance force when the movable member is at a second predetermined position is larger than the resistance force when the movable member is at the predetermined position.

30. The image forming apparatus according to claim 25, wherein the first direction becomes closer to a direction parallel to a vertical downward direction,
wherein the movable member moves from the predetermined position to a third predetermined position by moving in the first direction, and wherein the resistance force when the movable member is at a third predetermined position is larger than the resistance force when the movable member is at the predetermined position.

* * * * *